(12) United States Patent
Gopinath et al.

(10) Patent No.: US 9,769,205 B2
(45) Date of Patent: Sep. 19, 2017

(54) SYSTEMS AND METHODS FOR SSL SESSION MANAGEMENT IN A CLUSTER SYSTEM

(71) Applicant: Citrix Systems, Inc., Fort Lauderdale, FL (US)

(72) Inventors: Sikha Gopinath, Bangalore (IN); Ashoke Saha, Bangalore (IN); Tushar Kanekar, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 72 days.

(21) Appl. No.: 14/245,528

(22) Filed: Apr. 4, 2014

(65) Prior Publication Data

US 2014/0304499 A1     Oct. 9, 2014

Related U.S. Application Data

(60) Provisional application No. 61/809,318, filed on Apr. 6, 2013.

(51) Int. Cl.
*H04L 29/06* (2006.01)
*H04L 29/08* (2006.01)

(52) U.S. Cl.
CPC .......... *H04L 63/168* (2013.01); *H04L 63/166* (2013.01); *H04L 67/1002* (2013.01); *H04L 67/14* (2013.01); *H04L 69/30* (2013.01)

(58) Field of Classification Search
CPC ... H04L 63/0428; H04L 63/166; H04L 63/08; H04L 63/0823; H04L 63/164
USPC .................................................. 713/151–153
See application file for complete search history.

(56) References Cited

U.S. PATENT DOCUMENTS

2010/0325419 A1* 12/2010 Kanekar ............. H04L 63/0823
                                                      713/151
2010/0325420 A1* 12/2010 Kanekar ............. H04L 63/0823
                                                      713/151

* cited by examiner

*Primary Examiner* — Evans Desrosiers
(74) *Attorney, Agent, or Firm* — Foley & Lardner LLP; Christopher J. McKenna

(57) ABSTRACT

The present invention is directed towards systems and methods for managing one or more SSL sessions. A first node from a cluster of nodes intermediary between a client and a server may receive a first request from the client to use a first session established with the server. The first request may include a session identifier of the first session. The first node may determine that the first session is not identified in a cache of the first node. The first node may identify, via a hash table responsive to the determination, an owner node of the first session from the cluster using a key. The key may be determined based on the session identifier. The first node may send a second request to the identified owner node for session data of the first session. The session data may be for establishing a second session with the server.

20 Claims, 22 Drawing Sheets

SYSTEMS AND METHODS FOR SSL SESSION MANAGEMENT IN A CLUSTER SYSTEM

RELATED APPLICATIONS

This application is a nonprovisional of, and claims priority to U.S. provisional application 61/809,318, filed Apr. 6, 2013, entitled "SYSTEMS AND METHODS FOR SSL SESSION MANAGEMENT IN A CLUSTER SYSTEM", which is hereby incorporated by reference in its entirety for all purposes.

FIELD OF THE DISCLOSURE

The present application generally relates to the management of secure sockets layer (SSL) sessions. In particular, the present application relates to systems and methods for SSL session management in a cluster system.

BACKGROUND

Remote computing and centralized management of computing environments have converged to provide remote access to resources such as data and application resources, but also to incorporate management aspects including multi-level security (e.g., authentication and firewall policies), support for a variety of access points and client environments, and uniform presentation of resources. Systems, such as network appliances that help to provision applications and/or data to remote users may deliver computing and/or application services in a variety of ways. For example, dedicated servers may provide access to particular software applications by delivering application components to a remote client for execution. Network appliances may provide proxy functions such as secured session establishment. As application and computing needs evolve, such systems may have to provide a higher level of service in both delivery and performance. Accordingly, some of these systems may provide increased levels of parallel processing or multi-tasking by incorporating multiple hardware and software engines to process packets.

BRIEF SUMMARY

The present disclosure is directed towards methods and systems for SSL session management in a cluster system. A device or appliance, intermediary between one or more client and servers, may include a cluster system that comprises a group of nodes. Each of these nodes may comprise a multi-core system and may host one or more processing engines for handling packets. The present disclosure provides methods and systems to efficiently manage SSL sessions established across nodes and/or cores, including nodes having symmetric or asymmetric configuration. By interoperating between nodes within the cluster system, the nodes can present a single node image to a user or device interfacing with the appliance. These methods and systems can use a distributed hash table (DHT), that may allow any core receiving a session resume/reuse request, to identify an owner code of the requested session. The distributed hash table can receive as input a key derived from a session identifier, to output information about the owner core. Copies of the distributed hash table may be available to each core and/or node, and can be used to mark particular sessions that may be invalid or non-resumable. Based on the identification of the owner core, the owner core may be requested to provide a response that includes session information for the requested data. The receiving core may then establish a local cloned session of the requested session, responsive to the session resume/reuse request.

In one aspect, the disclosure is directed to a method for managing one or more secure socket layer (SSL) sessions. The method may include receiving, by a first node from a cluster of nodes intermediary between a client and a server, a first request from the client to use a first session established with the server. The first request may include a session identifier of the first session. The first node may determine that the first session is not identified in a cache of the first node. The first node may identify, via a hash table responsive to the determination, an owner node of the first session from the cluster of nodes using a key. The key may be determined based on the session identifier. The first node may send a second request to the identified owner node for session data of the first session. The session data may be for establishing a second session with the server.

In some embodiments, the first node may receive a request to reuse, resume or clone the first session. The first node may receive the request from the client as part of a handshaking process for establishing a SSL session with the server. The first node may determine that the first session is not identified in the cache based on the session identifier of the first session. The first node may determine that the first node is not the owner node of the first session. The first node may determine generate the key based on at least one of the session identifier or a unique identifier of an entity from which the first request is received. The first node may receive a response to the second request, the response indicating that the requested first session is invalid, expired or not resumable.

In certain embodiments, the first node may establish a new session if there is no response to the second request, or if a response to the second request does not include the requested session data. The first node may establish the second session if a response to the second request includes the requested session data, the second session comprising a session cloned from the first session. The first node may store information about the second session in at least one of the hash table or the cache of the first node.

In another aspect, the disclosure is directed to a system for managing one or more secure socket layer (SSL) sessions. The system may include a cluster of nodes intermediary between a client and a server. A first node from the cluster of nodes may be configured to receive a first request from the client to use a first session established with the server. The first request may include a session identifier of the first session. The first node may be configured to determine whether the first session is identified in a cache of the first core. The first node may be configured to identify, via a hash table responsive to the determination, an owner core of the first session using a key, the key determined based on the session identifier. The first node may be configured to send a second request to the identified owner core for session data of the first session. The session data may be for establishing a second session with the server.

In some embodiments, the first node is configured to receive a request to reuse, resume or clone the first session. The first node may be configured to receive the request from the client as part of a handshaking process for establishing a SSL session with the server. The first node may be configured to determine whether the first session is identified in the cache based on the session identifier of the first session. The first node may be configured to determine whether the first node is the owner node of the first session.

The first node may be configured to generate the key based on at least one of the session identifier or a unique identifier of an entity from which the first request is received.

In certain embodiments, the first node is configured to receive a response to the second request, the response indicating that the requested first session is invalid, expired or not resumable. The first node may be configured to establish a new session if there is no response to the second request, or if a response to the second request does not include the requested session data. The first node may be configured to establish the second session if a response to the second request includes the requested session data, the second session comprising a session cloned from the first session. The first node may be configured to store information about the second session in at least one of the hash table or the cache of the first node.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
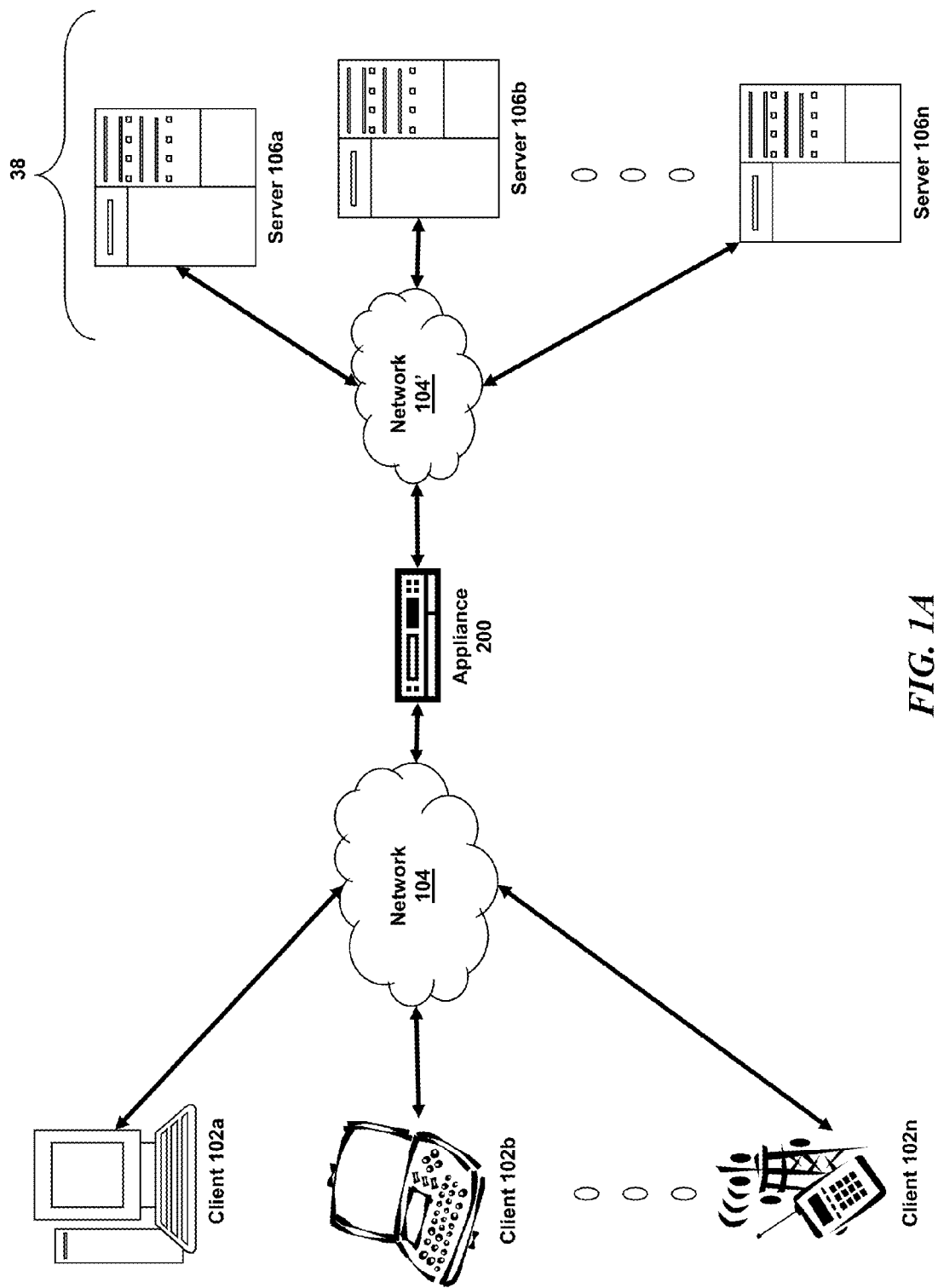
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for managing SSL session persistence and reuse in a multi-core system;

Section G describes embodiments of systems and methods for providing a clustered appliance architecture environment; and Section H describes embodiments of systems and methods for managing one or more secure socket layer (SSL) sessions.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality for identifying and providing address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
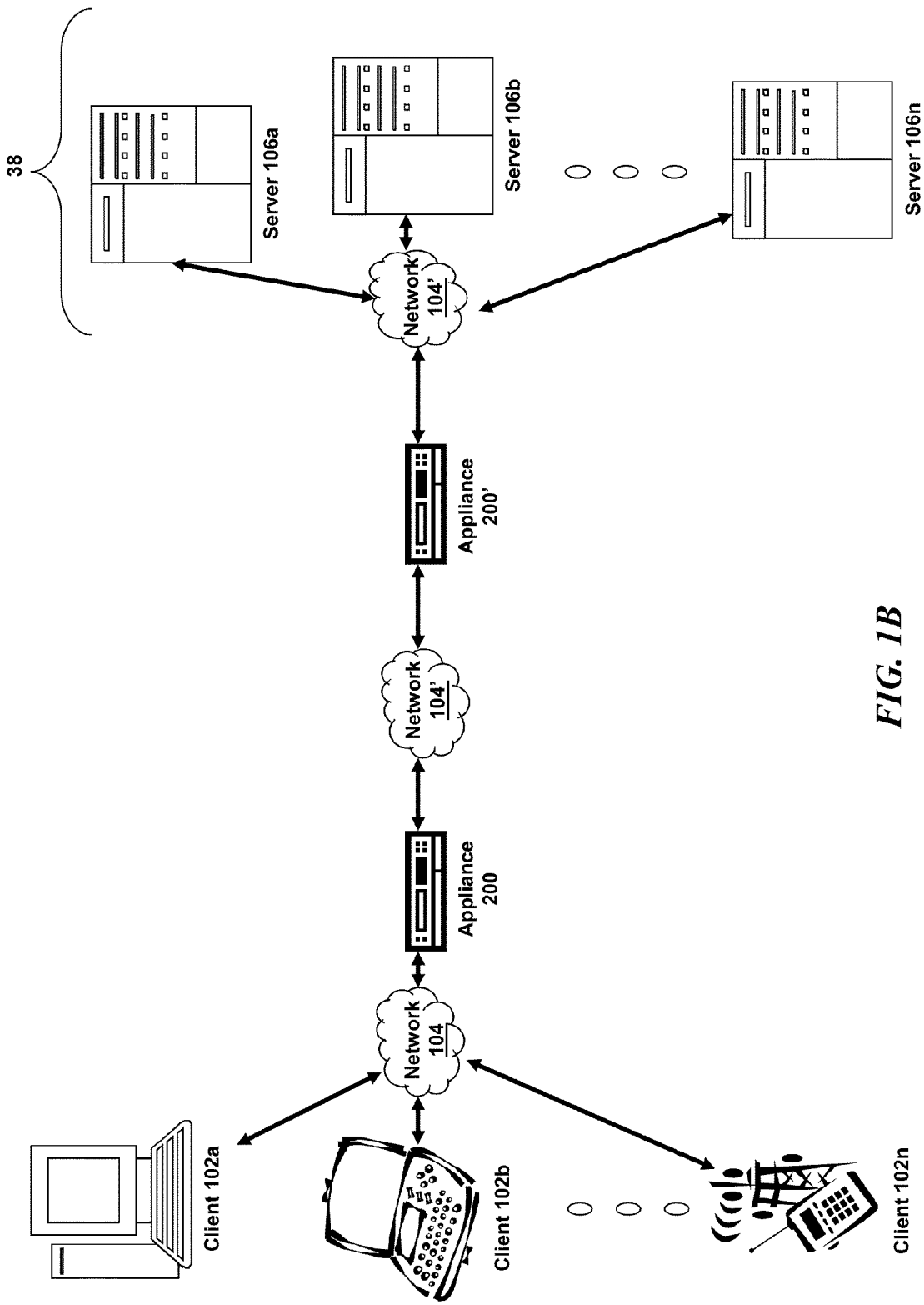
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1C:
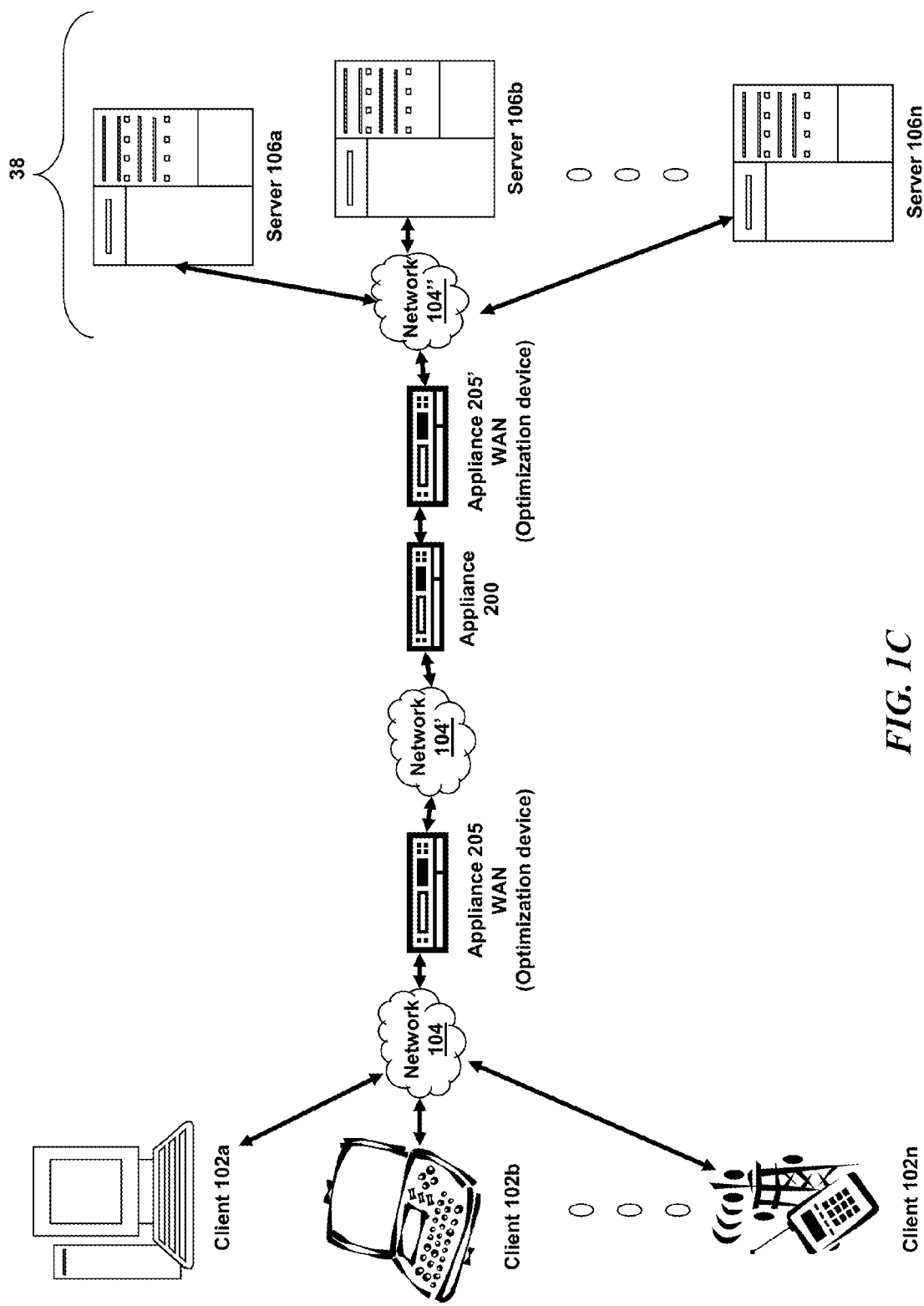
FIG. 1C is a block diagram of another embodiment of an environment for delivering a computing environment from a server to a client via an appliance.
Figure 1D:
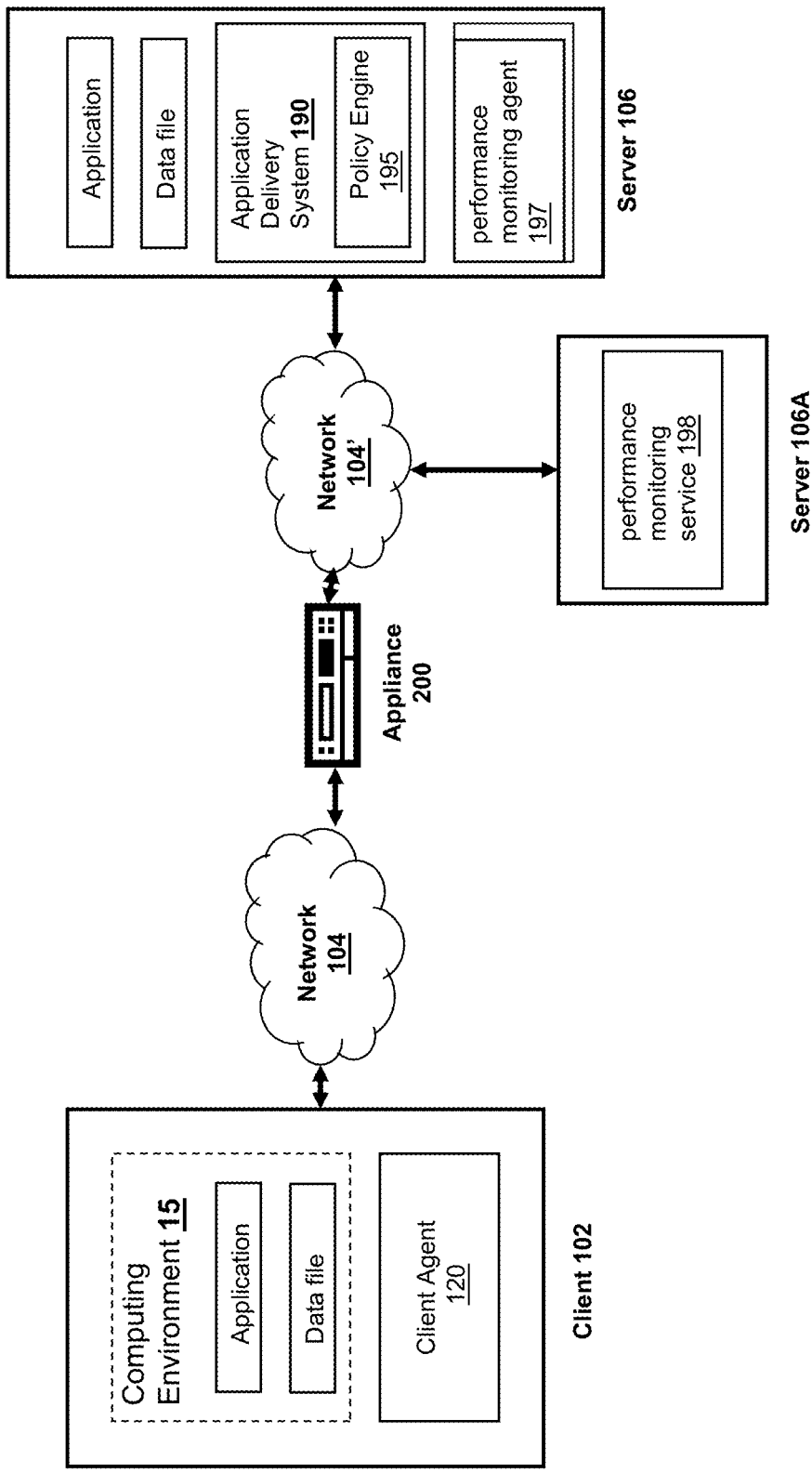
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/ or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
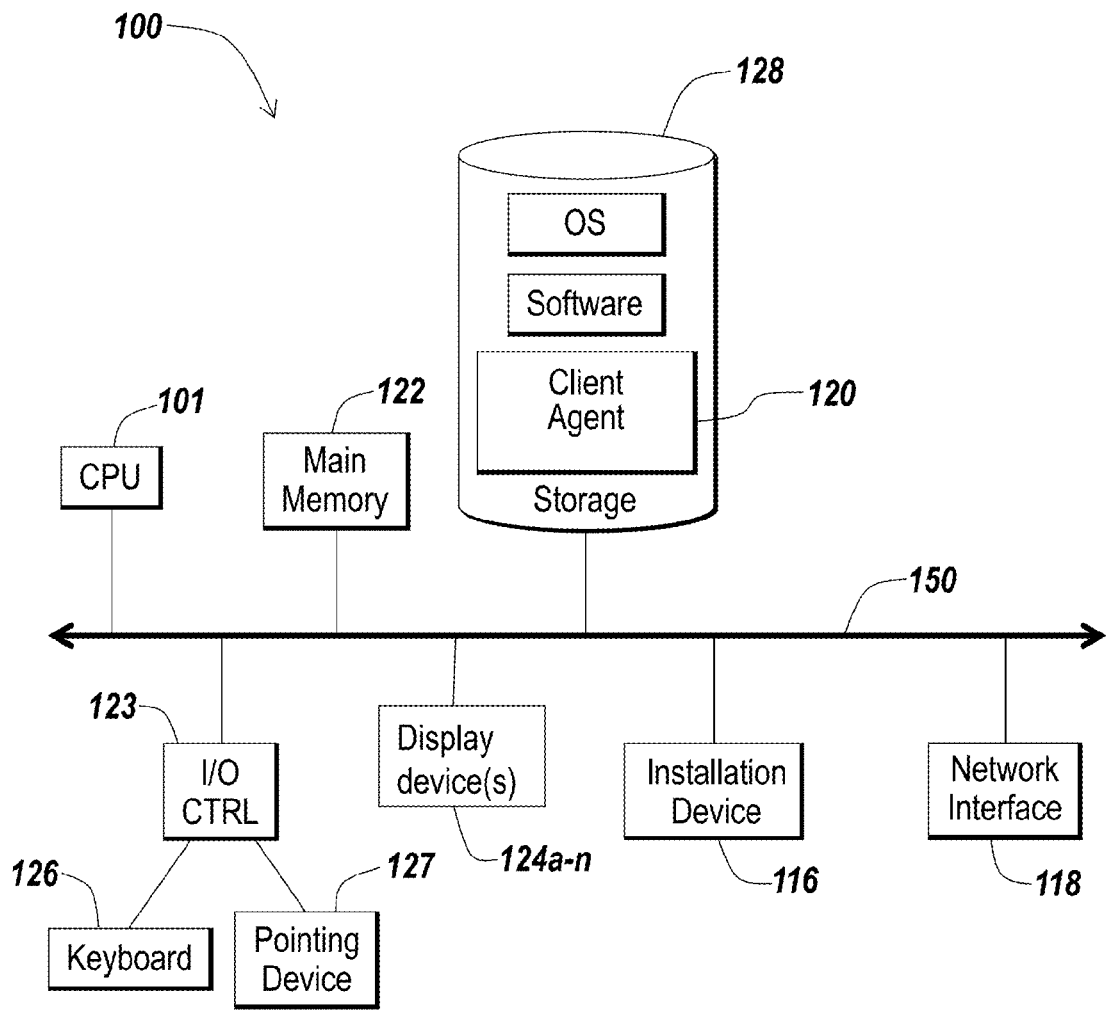
FIGS. 1E-1H are block diagrams of embodiments of a computing device.
Figure 1F:
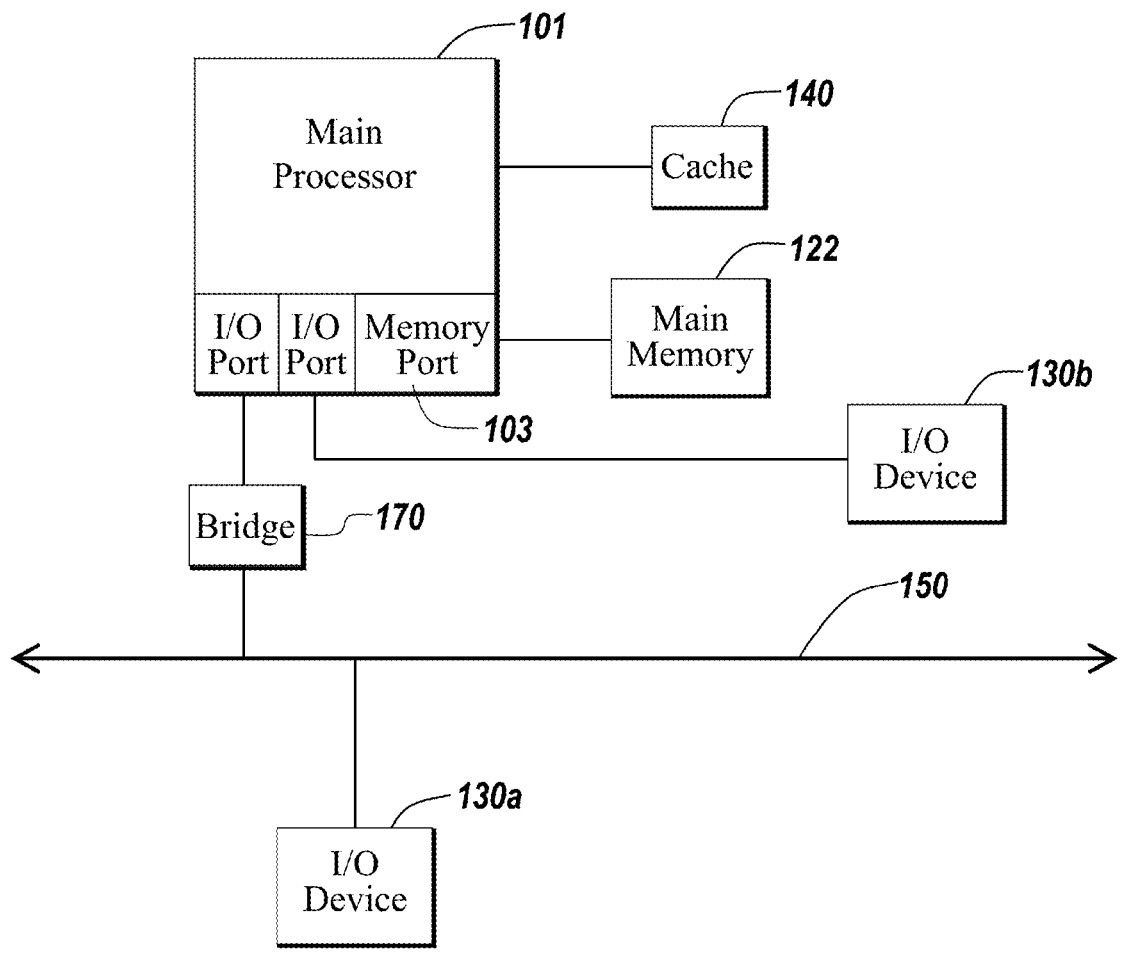

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly. The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further include a storage device, such as one or more hard disk drives or redundant arrays of independent disks, for storing an operating system and other related software, and for storing application software programs such as any program or software 120 for implementing (e.g., software 120 configured, designed and/or customized for) the systems and methods described herein. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
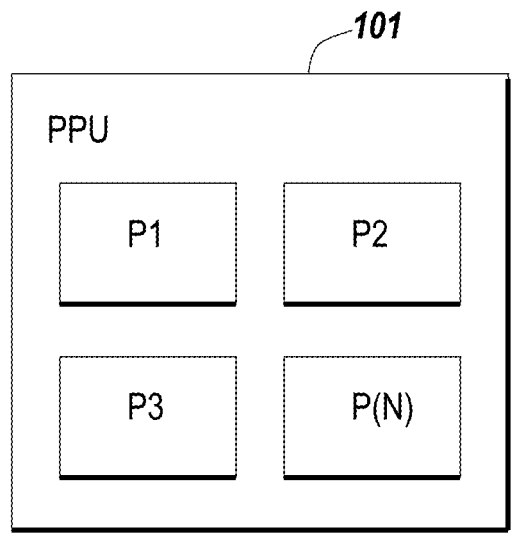

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
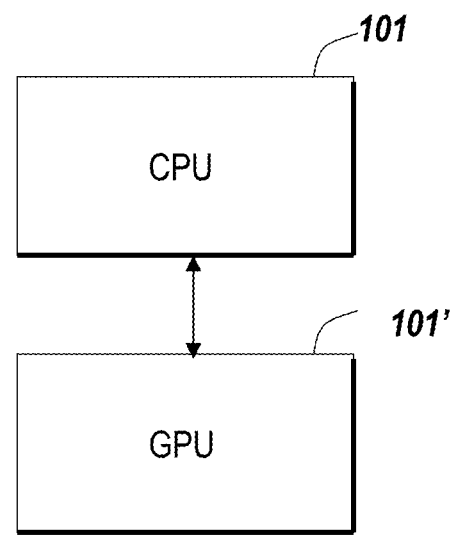

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
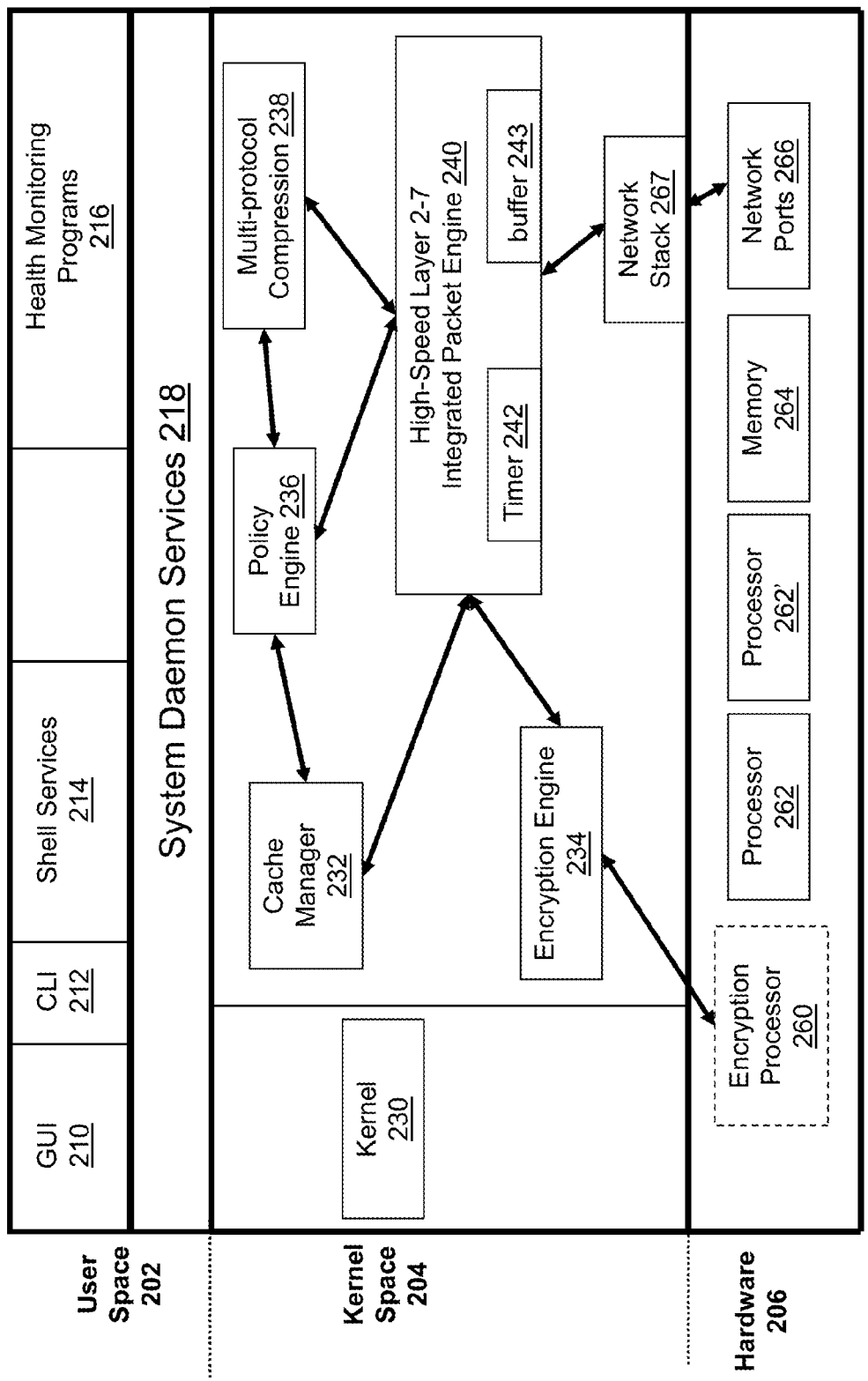
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may need longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
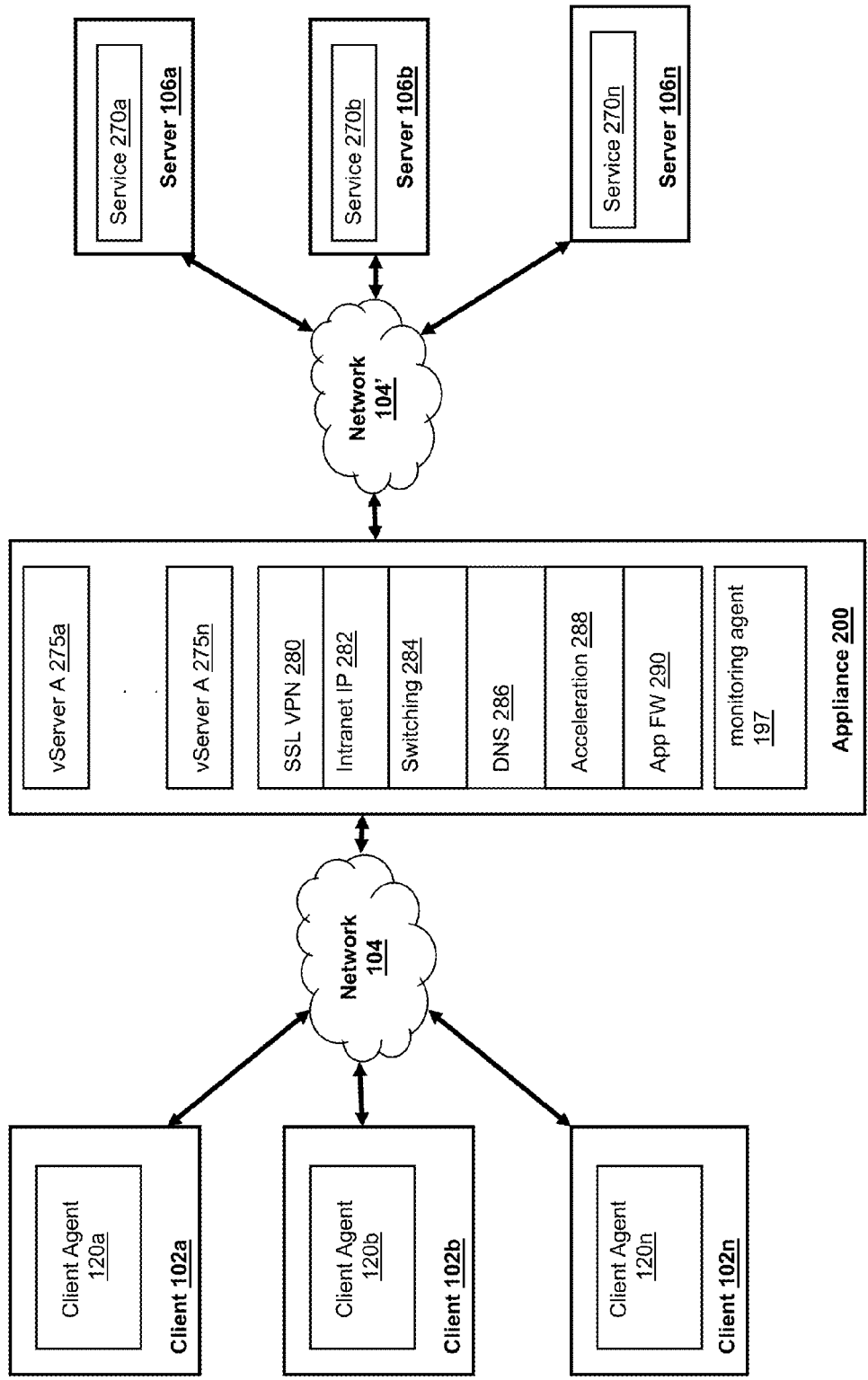
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction may be required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) some required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such as an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
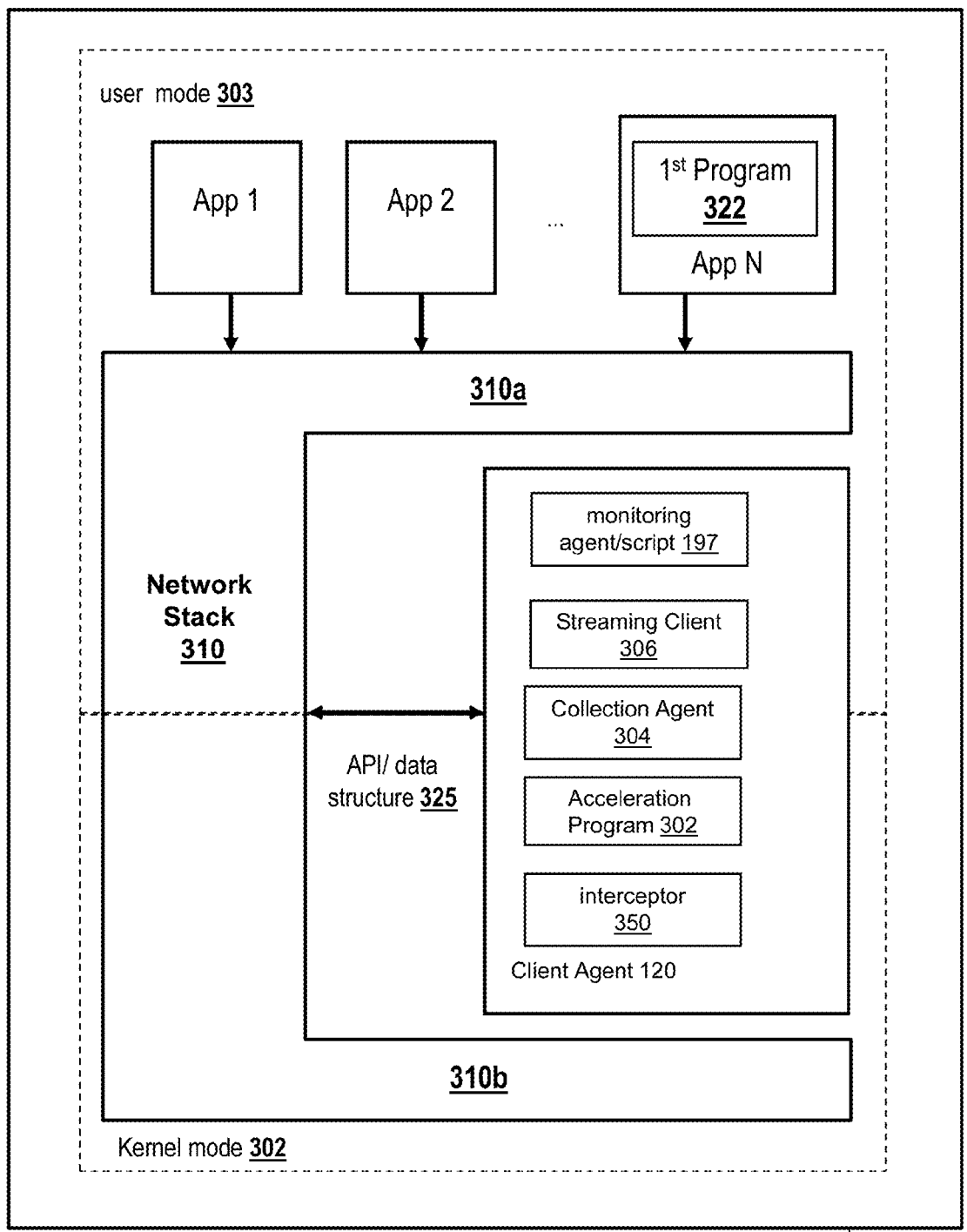
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
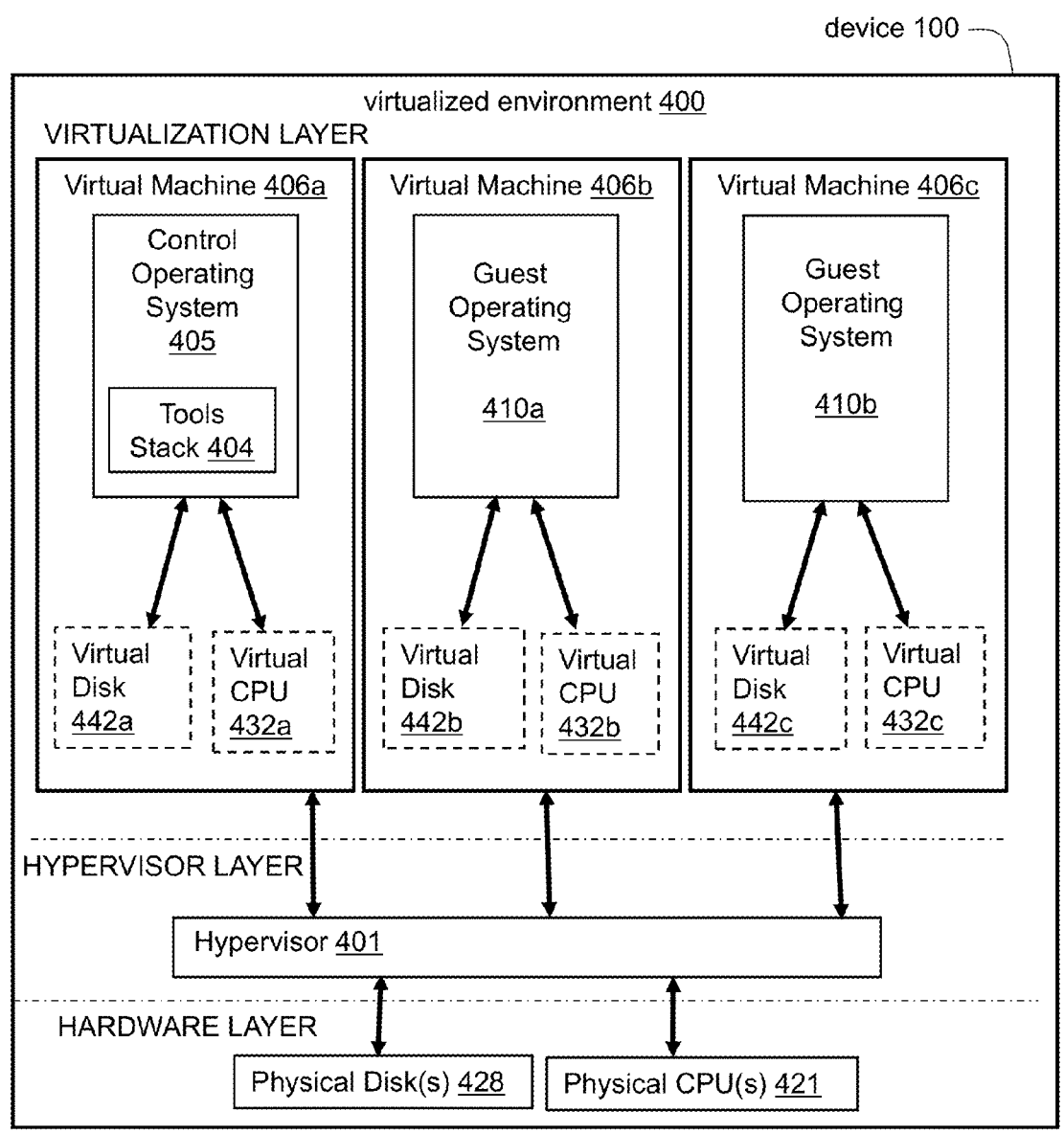
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406*a-c* (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405*a* on a computing device 100*a* may exchange data with a control operating system 405*b* on a computing device 100*b*, via communications between a hypervisor 401*a* and a hypervisor 401*b*. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
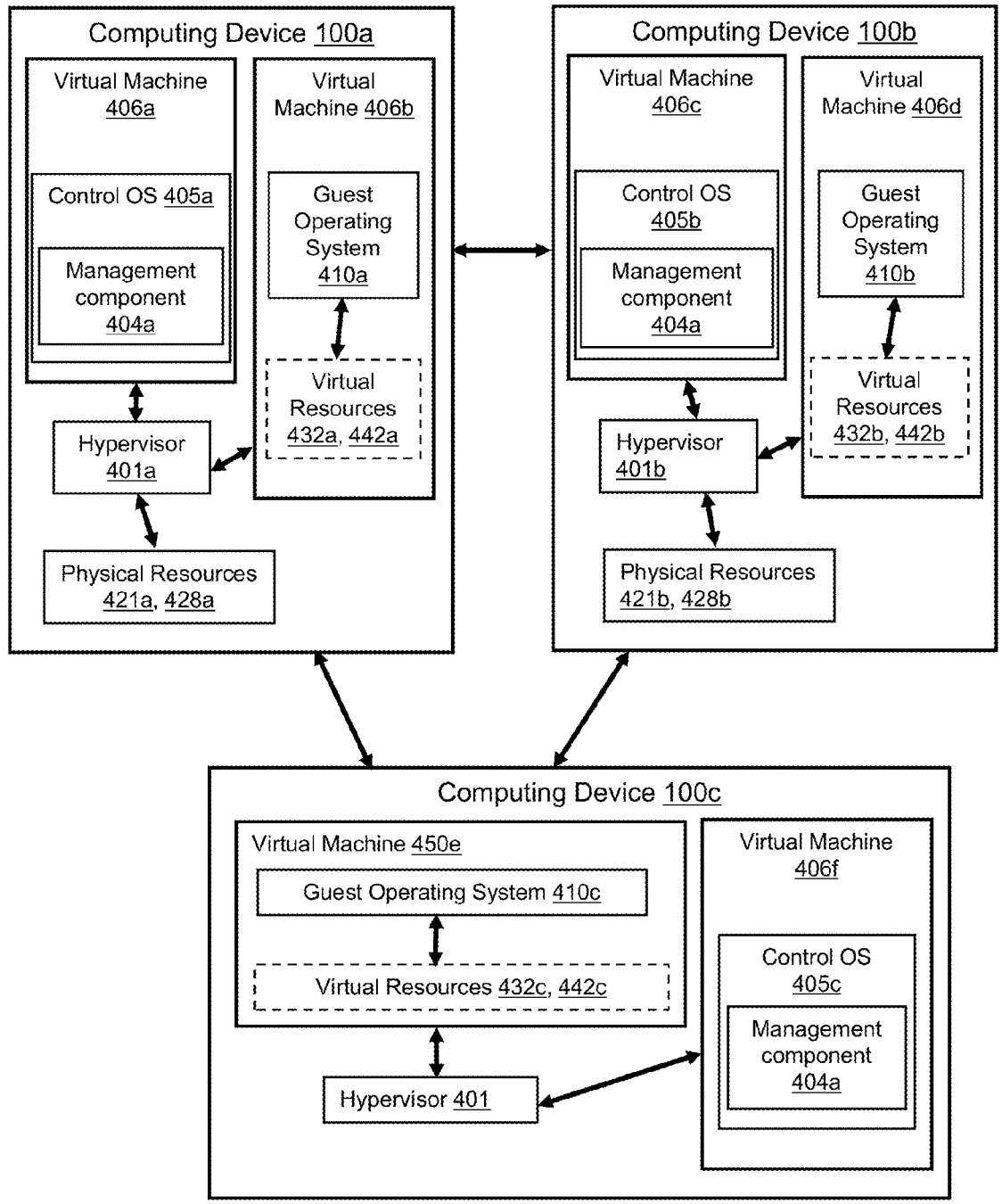
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404*a* is referred to as a pool management component 404*a*. In another embodiment, a management operating system 405*a*, which may be referred to as a control operating system 405*a*, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406*b* from one physical machine 100 to another. In further embodiments, the management component 404*a* identifies a computing device 100*b* on which to execute a requested virtual machine 406*d* and instructs the hypervisor 401*b* on the identified computing device 100*b* to execute the identified virtual machine; such a management component may be referred to as a pool management component.

Figure 4C:
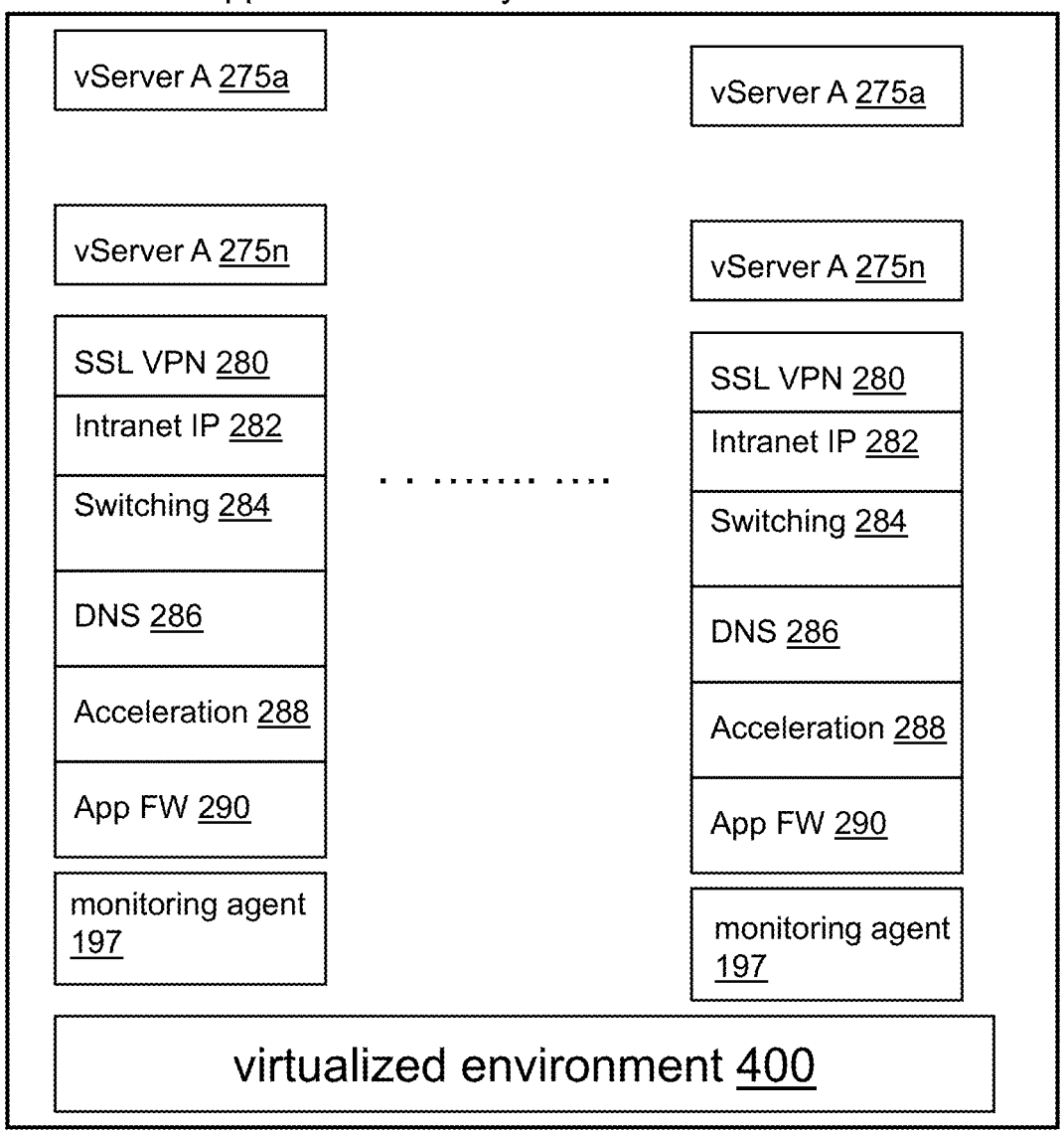
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406*a*-406*n* in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing A Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
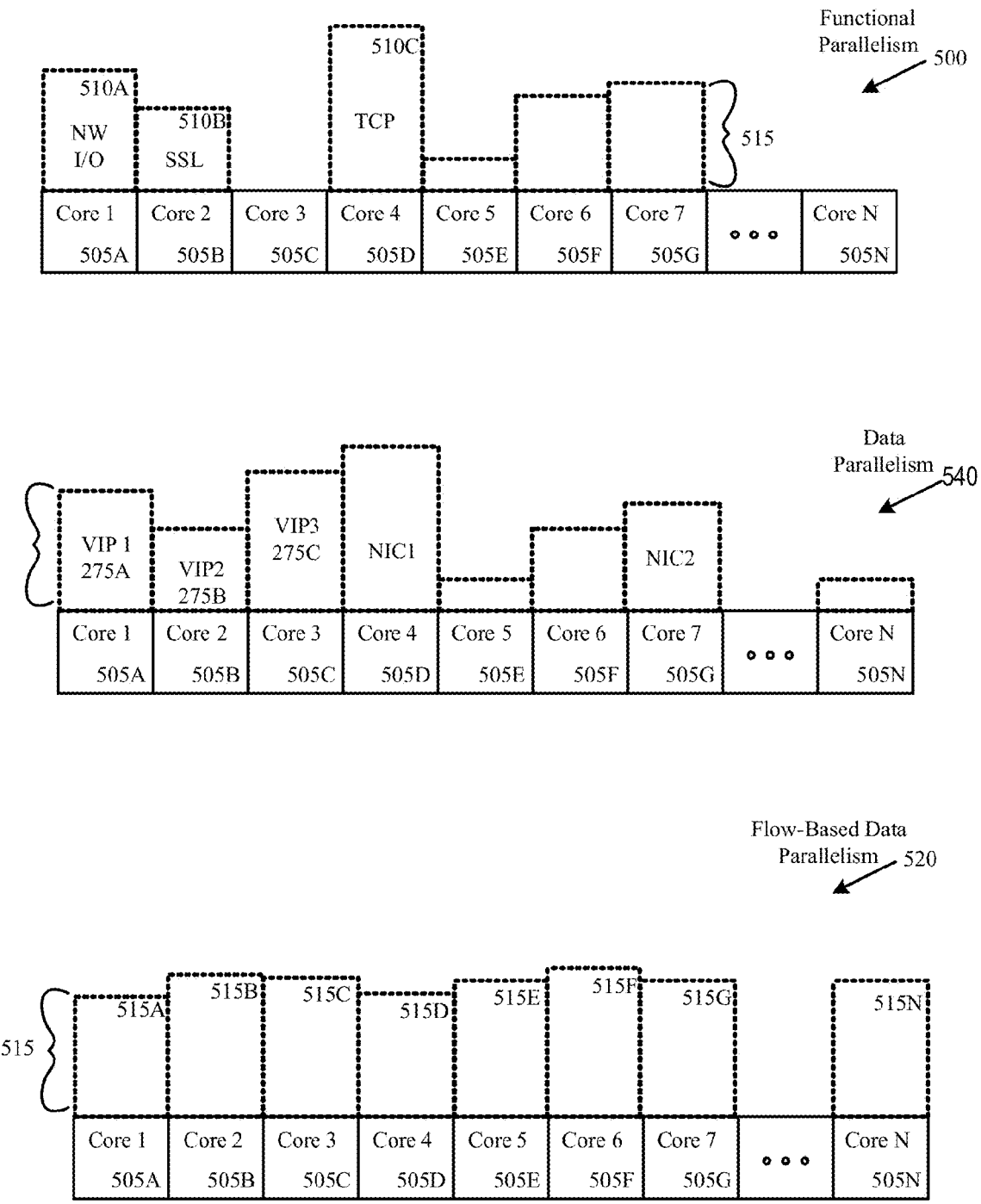
FIG. 5A are block diagrams of embodiments of approaches to implementing parallelism in a multi-core network appliance.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
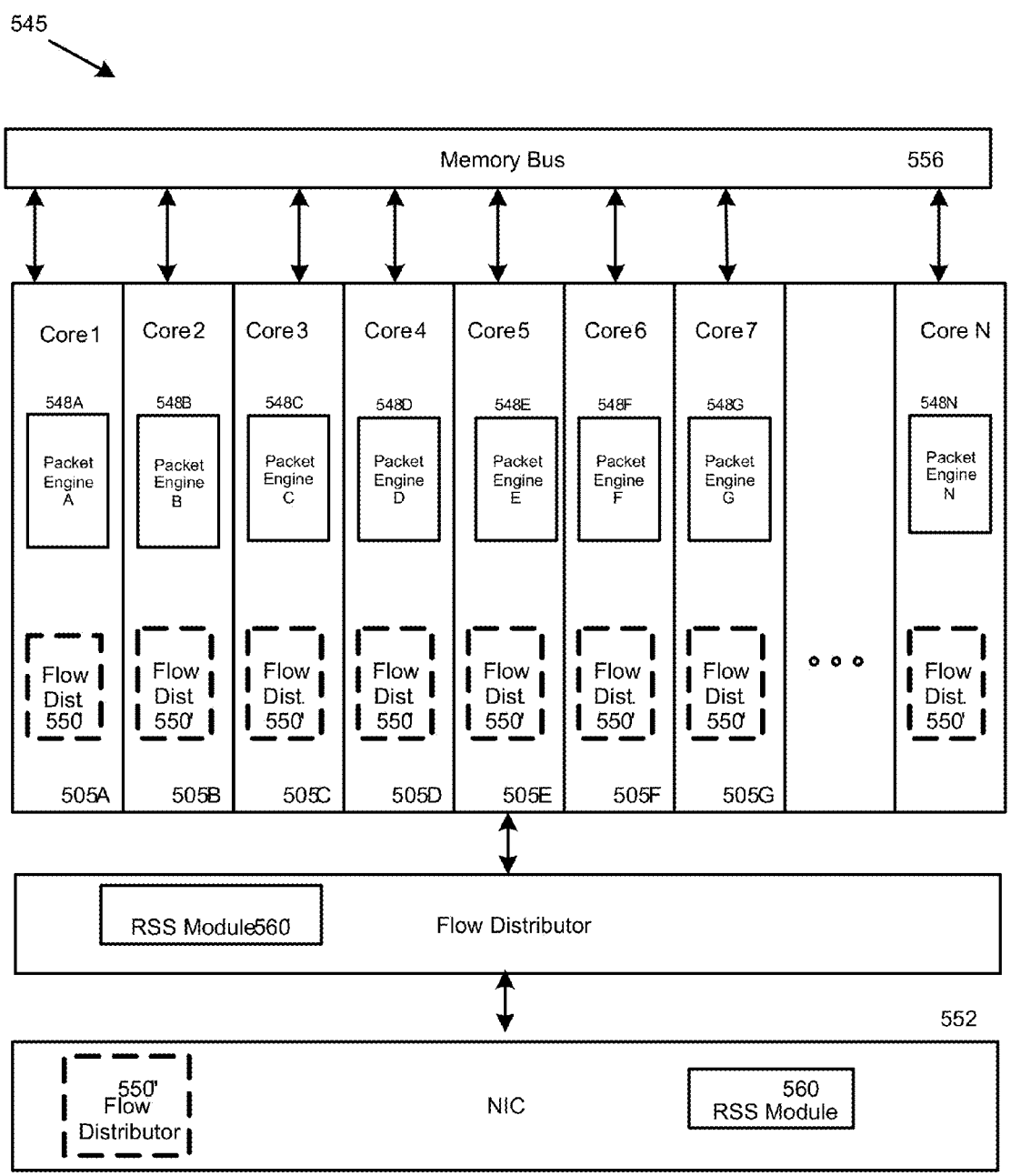
FIG. 5B is a block diagram of an embodiment of a system utilizing a multi-core network application.

The functionality or tasks may be distributed in any arrangement and scheme. For example, FIG. 5B illustrates a first core, Core 1 505A, processing applications and processes associated with network I/O functionality 510A.

Network traffic associated with network I/O, in some embodiments, can be associated with a particular port number. Thus, outgoing and incoming packets having a port destination associated with NW PO 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, provide that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/or manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software. In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

4-tuple of source TCP Port, source IP version 4 (IPv4) address, destination TCP Port, and destination IPv4 address.

4-tuple of source TCP Port, source IP version 6 (IPv6) address, destination TCP Port, and destination IPv6 address.

2-tuple of source IPv4 address, and destination IPv4 address.

2-tuple of source IPv6 address, and destination IPv6 address.

2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hash result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
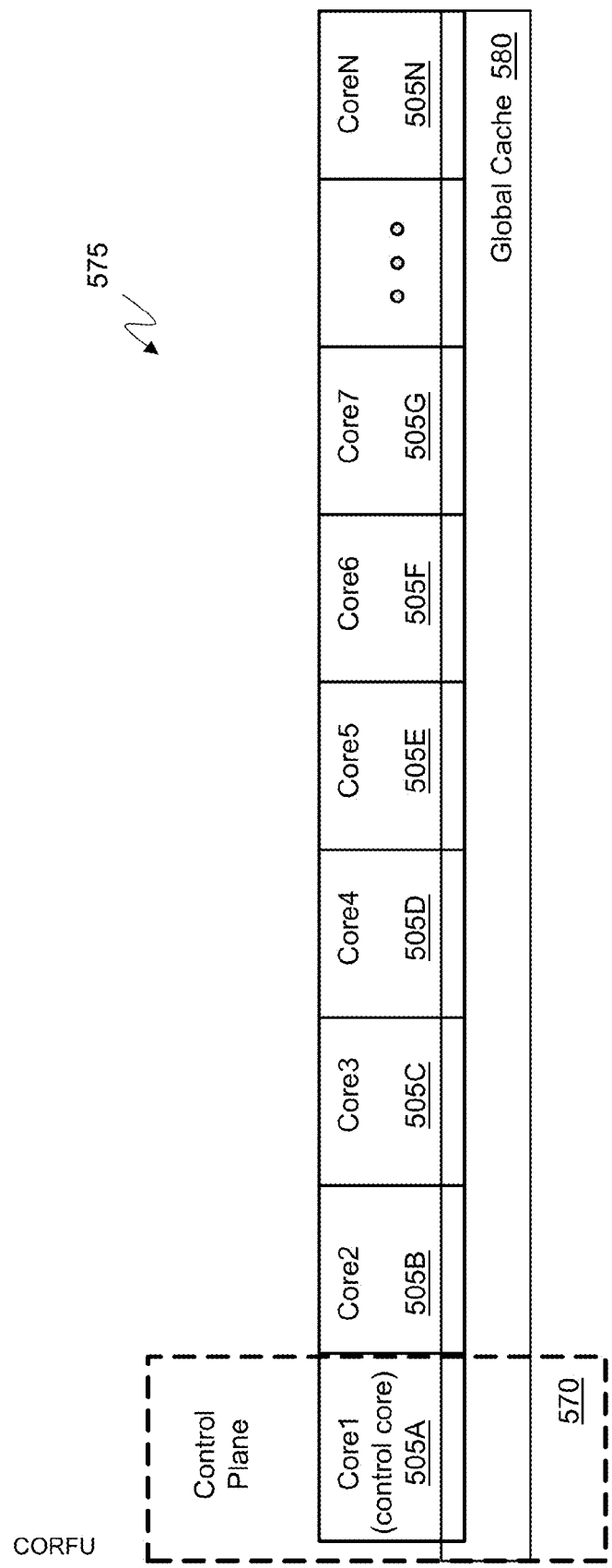
FIG. 5C is a block diagram of an embodiment of an aspect of a multi-core network appliance.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505.

In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Managing SSL Session Persistence and Reuse

A SSL session may be allocated private memory address space and associated with a SSL protocol stack that is independent from other SSL sessions. In a single-core system such as a single-core appliance 200 maintaining a SSL session between a client 102 and a server 106, the SSL session may be resumed if the SSL session is temporarily disrupted and/or inactive. For example, a disruption may occur due to a mobile client disconnecting and reconnecting to a network 104, or a server going offline due to inactivity or power loss. A client may send a request to resume the SSL session instead of establishing a new session. This may be more efficient in terms of the time and resources consumed in performing a full handshake process, allocating memory, starting a protocol stack and meeting authentication/authorization requirements. Furthermore, the disrupted SSL session may remain persistent although a connection may be lost. Resuming a SSL session may also maintain some level of continuity in client-server communications.

In some embodiments, a packet engine 240 maintains a connection between a client 102 and a core 661, directing packets from the client 102 to the core 661. The packet engine 240 can maintain a TCP connection through a core, for example, by identifying the core based on information from received packets and/or client 102. A flow distributor 550 may direct traffic to a packet engine 240 of a core by associating a connection based on information from received packets and/or client 102. In one embodiment, this information includes a TCP tuple or TCP quadruple. A TCP tuple may include information on a source IP address, a source port number, a destination IP address and a destination port number. The TCP tuple may be extracted from a packet. The TCP tuple may remain the same for a client connection and/or session. In some embodiments, a disruption to a connection of session may cause the TCP tuple to change. For example, the source port number may change if the client attempts to reconnect to the intermediary 200.

The flow distributor 550 may generate a hash index or other identifier based on a TCP tuple to associate the packet traffic with a core. In some embodiments, when a TCP tuple changes, a different hash index or identifier is generated and a second core 662 is identified instead. Upon a disruption to a connection or session, a client 102 may attempt to resume transmission of packets. These packets may come from a different application instance of the client 102. These packets may provide different source port information. Other components of the TCP tuple may also change. Based on a changed TCP tuple, the flow distributor may generate a second hash index or identifier and direct packet traffic from the client 102 to a second core 662 corresponding to the second hash index or identifier.

In some embodiments, use of a flow distributor 550 and/or packet engines in a multi-core system can result in higher SSL transactions per second (TPS) and/or bulk throughput numbers. Each core may have a virtual IP address (VIP) associated with the core that may or may not be established in relation to a SSL session 641. In some embodiments, the flow distributor 550 identifies each core via the VIP of the core.

Figure 6:
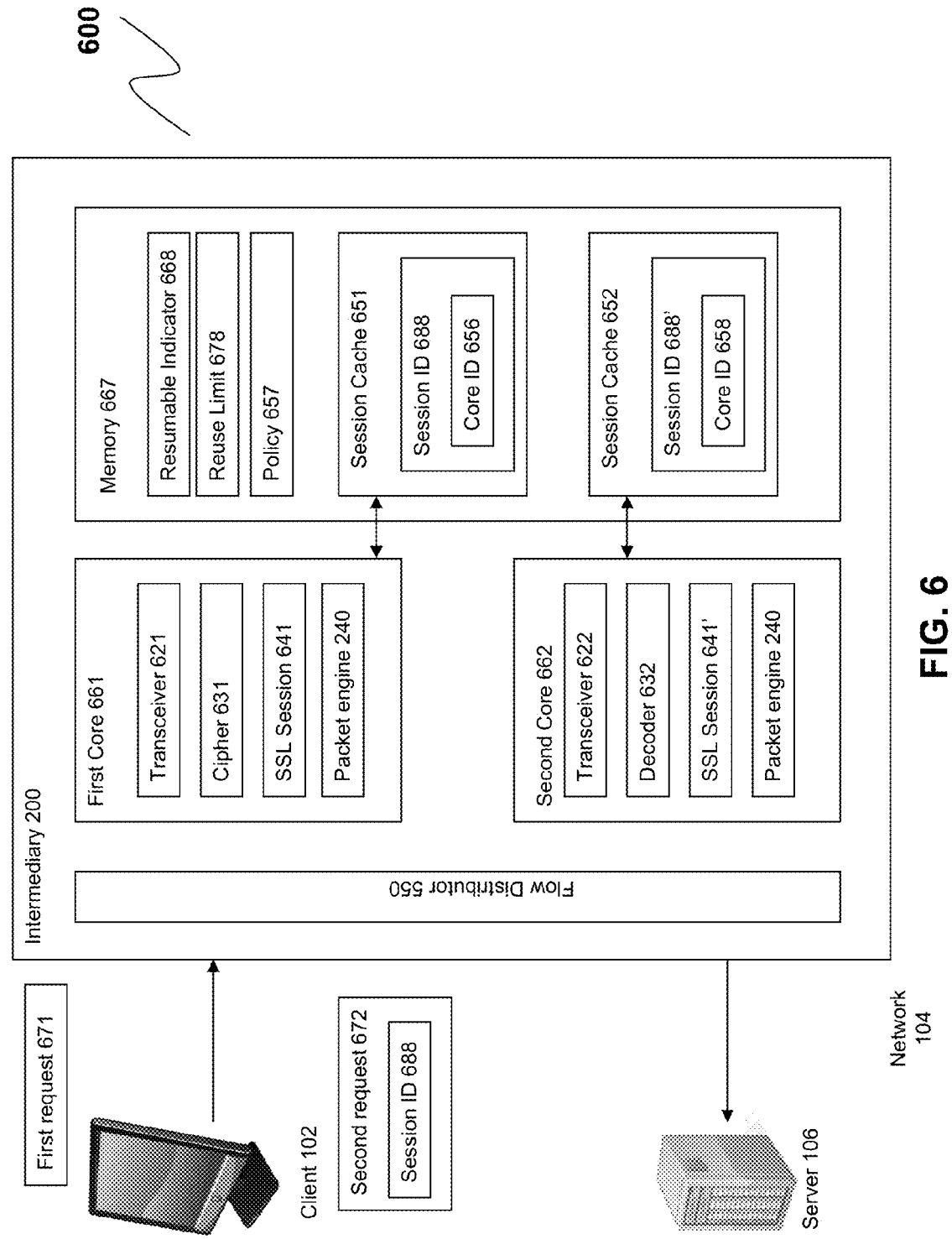
FIG. 6 is a block diagram of an embodiment of a system utilizing a multi-core network application.

Referring now to FIG. 6, an embodiment of a system 600 for managing SSL session persistence and reuse is depicted. In brief overview, the system includes an intermediary 200 between a client 102 and a server 106. The intermediary 200 comprises a multi-core system, a flow distributor 550, and a storage or memory module 667. In some embodiments, a SSL session 641 may be established and maintained by one of a plurality of cores in a multi-core system, such as the first core 661. This core 661 is sometimes referred to as the owner of the SSL session 641. Upon disruption of the SSL session 641, a client 102 may request resumption of the SSL session by sending a request 672 to the multi-core system. The flow distributor 550 may direct the request 672 to a second core 662 that will determine if it owns the disrupted SSL session 641. The second core 662 may identify the owner 661 of the session 641 and determine if the session can be resumed. The second core 662 can communicate with the first core 661 and receive information for cloning the disrupted SSL session for reuse by the second core 662. Upon completion of the cloning, the connection between the client and the server is resumed based on the cloned session 641'.

Each core 661, 662 of the multi-core system can include a transceiver 621, 622. The transceiver can receive packets or messages directed from the flow distributor 550. The transceiver can also communicate with other cores of the multi-core system. In some embodiments, inter-core communication involves sending a core-to-core messaging (CCM) message from a first core 661 to a second core 662. The transceiver may support packets and messages based on any type or form of communication protocols. The transceiver can also communicate with other components of the intermediary 200. For example, a core can access data from memory 667 using the transceiver as an interface. The transceiver can also transmit a packet or message to another machine such as server 106. The transceiver may direct outgoing packets or messages to a destination based on information from the associated TCP tuple.

Each core may include a decoder-encoder pair 631, 632 (hereinafter generally referred to as a "cipher"). A cipher may comprise hardware or any combination of software and hardware. The cipher may include an application, program, library, script, process, task, thread or any type and form of executable instructions. Although the cipher is illustrated as part of a certificate manager, in some embodiments, the cipher may be a separate component or module of the multi-core system. In one embodiment, the cipher may include a general-purpose encoder/decoder. In another embodiment, the cipher is designed and constructed to encode/encrypt or decode/decrypt any type and form of information, such as session identifiers 688 and/or core identifiers 656, 658. In one embodiment, the ciphers 631, 632 are block ciphers. Further, the ciphers may include functionality from any embodiment of the encryption engine 234 described in connection with FIG. 2. In some embodiments, the system 600 uses data encryption standard (DES) ciphers, such as standard DES ciphers and 3DES ciphers.

The first core 661 is assigned a core identifier 656. The core identifier 656 may be any type or form of alphanumeric identifier or code string. In addition, this core identifier 656 may be unique among the plurality of cores of the multi-core system. The core identifier 656 may be a CPU number of the core 661, or incorporate the CPU number of the core 661. A core identifier 656 may be assigned sequentially to each core based on the CPU numbers of the cores. The core identifier 656 can be of any size. In one embodiment, the core identifier 656 is one byte in size. In particular, one byte can give 256 (0-255) unique core identifiers.

The first core 661 can establish a SSL session 641 between the client 102 and the server 106. The SSL session 641 may be established in connection with the cipher 631 and/or functionality from any embodiment of the encryption engine 234 described in connection with FIG. 2. The SSL session 641 is assigned a session identifier 688 which can be any type or form of alphanumeric identifier or code string. The first core 661, the backend server 106 or the client 102 may issue the session identifier 688. The session identifier 668 may uniquely identify the SSL session among a plurality of SSL sessions associated with the multi-core system. A session identifier 688 may be a random 16 or 32 byte value. In one embodiment, the X-OR of the byte[0] with byte[1] location of the session identifier 688 results in a random value. By randomly selecting a one-byte location in the session identifier 688 for encoding the core identifier 656, such as at system boot time, additional security and randomness with respect to the session identifier 688 may be incorporated. In one embodiment, a SSLv2 session identifier 688 has a size of 16 bytes and the last 4 bytes may contain a time-stamp. In this embodiment, the one-byte location for the core identifier 656 is preferably between byte 0 to byte 11. In another embodiment, a session identifier 688 is 32 bytes for SSLv3 and TLSv1. The lower 4 bytes may be taken up by the timestamp, allowing 28 bytes for encoding a core identifier in SSLv3/TLSv1 protocol. Other than the byte locations reserved for timestamp purposes, the byte location for encoding a core identifier may be selected by any means.

By way of illustration and not limiting in any way, one embodiment of pseudo code for encoding a core identifier may be:

```
sessionid[0] = coreid;
sessionid[0] ^= sessionid[1];
``` and one embodiment of pseudo code for retrieving the core identifier may be:

```
coreid = sessionid[0] ^ sessionid[1];
```

In some embodiments, a valid-session identifier is encoded with a core identifier. A valid-session identifier is sometimes referred to as a validity identifier. A valid-session identifier can be a string that identifies a valid session. As an example, a cipher may use 8 bytes to encode the valid-session identifier and the core identifier. The intermediary 200 or the multi-core system can determine whether a session 641 is valid. In one embodiment, use of a valid-session identifier helps to filter away random or malicious requests to reuse a session. A valid-session identifier may also identify active reused sessions.

In some other embodiments, the core identifier 656 is not encoded within a byte or a range of bits of a session identifier. Instead, individual bits of a session identifier 688 can be used to encode a core identifier 656. The core identifier 656 can be encoded as a bit pattern in the session identifier 688. Other than the byte locations that are reserved for timestamp purposes, the individual bit locations for encoding a core identifier 656 may be selected by any means. When a session identifier 688 is generated by the core 661 owning the SSL session 641, individual bits can be set to encode the core identifier 656. The number of bits that are set or unset may depend on the number of cores in the multi-core system. This method may impose a relatively small footprint on session identifiers as the number of bits affected is limited to the number of cores in the multi-core system.

The first core 661 or the packet engine 240 of the first core 661 may store the session identifier 688 in a session cache of the first core 661. In one embodiment, the session cache 651 is persistent for the duration that the core 661 is powered up and/or the duration that a session 641 is maintained. In another embodiment, the session cache 651 is persistent even when the core 6671 is powered down, or when a session 641 has ended. The session cache 651 can be memory allocated to the first core 661 and/or the SSL session 641. The session cache 651 may be accessed by one or more cores. In some embodiments, the first core 661 maintains and/or updates the session cache 651. The memory module 667 may include the session cache 651. The memory module 667 may comprise one or more interconnected storage devices, such as any embodiment of storage devices 128, 140, 122, 264, 667 described above in connection with FIGS. 1E, 1F and 2A.

In some embodiments, the session cache 651 stores the session identifier 688 of the SSL session 641 established by the first core 661. The session cache 651 may store a plurality of session identifiers, such as session identifiers of sessions established by the first core 661. The first core 661 may encode the core identifier 656 in the session identifier 688 to form a second session identifier 688'. In some embodiments, the cipher 631 encodes the core identifier 656 in the session identifier 688 to form the second session identifier 688'. In one embodiment, the cipher 631 encodes the core identifier 656 in one byte of the session identifier 688. Encoder/decoder routines of the cipher 631 can securely encode the core identifier 656 in the second session identifier 688' and/or decode the core identifier 656. Encoder/decoder routines of the cipher 631 can also securely encode/decode a valid-session-identifier in association with the session identifier 688. In another embodiment, the core identifier 656 can be directly stored into bits of the second session identifier 688'. The second session identifier 688' can be stored in the session cache 651 either with the session identifier 688 or in replacement of the session identifier 688.

In some embodiments, the second core 662 is substantially similar or identical to the first core 661 in terms of functionality, capability and/or associated elements. For example, the second core includes a transceiver 622 and a decoder 632, and is associated with a session cache 652. The second core 662 can be assigned a unique core identifier 658. The second may similarly establish a new SSL session. In addition, the second core 662 may reuse a SSL session 641 of the first core 661.

The intermediary 200 includes a set of policies 657. These policies 657 may be any embodiments of the policies described in connection with FIGS. 1D, 2A, 2B and 3. These policies 657 may be applied to a request, such as a request 672 to resume a SSL session. The policies 657 can also determine to which core the flow distributor 500 directs an incoming message. In addition, an associated policy engine may apply the policies 657, for example, to determine whether a session can be resumed or reused. In some embodiments, the policies 657 are stored in the memory module 667. For example, the policies can be stored in a private partition of the memory module 667. Some of these policies 656 may be grouped and associated with a client 102 and/or a server 106.

A core may resume a session that it has established. For example, a core may resume a session that it has established by restarting part of the protocol stack of the session that was disrupted. A core may resume a session that was established by another core, by creating a copy or clone of the session in the core. In some embodiments, the latter case is referred to as a reuse of the session. In these embodiments, resuming a session may have a broader scope than reusing a session. In other embodiments, session resume or reuse can be used interchangeably. In still other embodiments, reuse refers to the reuse of some elements of a session, such as security parameters of the session.

Each SSL session may be associated with a resumable indicator 668. The resumable indicator 668 may be predetermined or dynamically updated. An administrator, the server 106 or a core 661 establishing a SSL session 641 may determine and/or set an associated resumable indicator 668. The resumable indicator 668 may be determined and/or set via analysis of session history and/or statistics, such as via any algorithm or process steps. In other embodiments, a core 662 reusing the SSL session 641 may be able to update the resumable indicator 668 of the SSL session 641. In some other embodiments, a core 662 reusing the SSL session 641 may send information to the owner 661 of the SSL session 641 to update the resumable indicator 668 of the SSL session 641.

The resumable indicator 668 may indicate whether a request 672 to resume a SSL session should be allowed. The resumable indicator 668 may indicate whether a request to resume a SSL session 641 is allowed subject to a reuse limit 678 and/or other factors. A resumable indicator 668 may be set based on the state of the SSL session, for example, whether the session is active and/or is being reused by one or more cores. In one embodiment, the resumable indicator 668 may be set as non-resumable when the SSL session 641 is still active. In another embodiment, the resumable indicator 668 may be set as resumable if an inactive SSL session 641 has not expired and/or is not corrupted. In one embodiment, if a fatal alert is sent or received in a SSL session 641, the corresponding resumable indicator 668 is set as non-resumable. In some embodiments, if the resumable indicator 668 is set as non-resumable, all further session resume requests may be rejected or discarded.

A second core 662 processing a request 672 to reuse and/or resume a SSL session 641 may access the resumable indicator 668 to determine whether the SSL session 641 is resumable. The resumable indicator 668 may be stored at a shared location in memory 667 accessible by a plurality of cores. The resumable indicator 668 may also be stored at a location in memory 667 accessible by each core of the multi-core system. In some embodiments, the resumable indicator 668 of a SSL session established by a core can be stored in the session cache 651 of that core and/or that session. The resumable indicator 668 may be stored in a location in shared memory. The resumable indicator 668 may be one byte in size although other embodiments are supported. In some embodiments, the stored value is a pointer to a larger memory location. In other embodiments, a plurality of cores (e.g., cores requesting reuse of the SSL session 641) can each store a copy of the resumable indicator 668. In one of these embodiments, the plurality of cores having a copy of the resumable indicator 668 may check for updates to the resumable indicator 668, or receive a notification of an update to the resumable indicator 668. An update or notification may be sent as a CCM message from the first core 661. An update or notification may be sent to cores identified to be reusing the SSL session 641.

In some embodiments, the packet engine 240 stores a reuse limit 678 to a memory module 667. A reuse limit 678 is sometimes referred to as a maximum reuse threshold. This reuse limit 678 may indicate the number of times a session can be resumed or reused. This reuse limit 678 may be predetermined or dynamically updated. The reuse limit 678 may be determined and set by an administrator and/or via analysis of session history and/or statistics, such as via any algorithm or process steps. The first core 661 may specify a reuse limit 678*a* directed to the first core 661, to the multi-core system, or to the SSL session 641 established by the first core 661. A second core 662 reusing a SSL session 641 owned by the first core 661 may specify a reuse limit 678*b* directed to the second core 662. The reuse limit 678 of a session for a core can be stored in the session cache 651 of that core and/or that session. The reuse limit 678 may also be stored in a shared location in memory 667 accessible by a plurality of cores. The reuse limit 678 of a core may also be stored in memory partitioned or allocated for a core. In some embodiments, a reuse limit 678 may be set to limit the reuse of a session that may be inherently unstable or prone to disruption. In other embodiments, a reuse limit 678 may be set to limit cumulative and/or parallel reuse of a SSL session by a plurality of cores.

In some embodiments, if the resumable indicator 668 for a session indicates that that the session is non-resumable, reuse of the session is not allowed. In one of these embodiments, the reuse limit 668 is removed. In another of these embodiments, the reuse limit 668 is set to zero. A core attempting to process a request 672 to reuse and/or resume a SSL session 641 may access the reuse limit 678 to determine whether the SSL session is reusable. If the resumable indicator 668 for a session indicates that that the session is resumable and the reuse limit 678 of a core and/or session is not reached, reuse of the session may be allowed. In some embodiments, the reuse limit 678 and the resumable indicator 668 are determined and/or set independently. In other embodiments, the reuse limit 678 and the resumable indicator 668 are determined and/or set in relation to each another. In some other embodiments, the reuse limit 678 and/or the resumable indicator 668 are determined in accordance with other factors such whether the session has expired and/or is corrupted.

To resume a SSL session 641, a client may send a request 672 to the intermediary 200. The flow distributor 550 of the intermediary 200 can process the request 672 and/or forward the request to one of the plurality of cores. The request 672 may include a session identifier 688 of the SSL session 641 identified to resume. The request 672 may also include any information related to the session 641, the client 102, the server 106 and the first core 661. If a second core 662 receives the request, the second core 662 may send a message to the first core 661 requesting for information about the SSL session 641. The second core 662 can use this information about the SSL session 641 to copy, clone, reconstruct, duplicate, mirror or otherwise create a SSL session 641' substantially similar to the original SSL session 641. This process may be generally referred to as cloning a session. The SSL session 641' is sometimes referred to as a copy of the original session 641, or a clone of the original session 641.

The information about the SSL session 641 may include one or more of: protocol stack information, TCP tuple information, a master key, a client certificate, a name of a cipher, a result of client authentication, and an SSL version. Some or all of these information may be held in the SSL session data structure of the SSL session 641. The second core 662 may access some or all of these information via the first core 661. Although information for generating an identical SSL session may be available in the session data structure of the SSL session 641, a complete copy of the session data structure may not be required to clone and resume the SSL session.

In some embodiments, protocol stack information may be determined from the SSL version information. In other embodiments, information on the state and/or components of the protocol stack, such as that of drivers and agents that may be dynamically installed and/or configured, can be used for cloning the SSL session 641. The first core 661 may use at least some portions of TCP tuple information to clone the SSL session 641. The first core 661 may also obtain TCP tuple information from the request 672.

A first core 661 or a packet processor 240 of the core can use a master key for the SSL session to manage security, for example data encryption and decryption, and securing transactions though authorization and authentication. The master key can be applied to SSL certificates. The master key can be 48 bits long although other embodiments are also supported. In some embodiments, the master key can be a Federal Information Processing Standard (FIPS) key, such as one generated by a FIPS card. The intermediary 200 may include a FIPS card in communication with the first core 661. The master key can also be created by a certificate authority (CA), such as a local CA residing in the intermediary 200. In one embodiment, the CA executes on the first core 661 and generates certificates, certificate revocation lists (CRLs) and certificate signing requests (CSRs) in addition to the keys. By way of illustration and not limiting in any way, one embodiment of a set of typical commands for a CA is as follows:

create ssl rsakey
    convert ssl pkcs12
    convert ssl pkcs8
    create ssl dhParam
    create ssl dsaKey
    create ssl crl
    create ssl certReq
    create ssl cert The second core 662 may request some or all of the generated information from the first core 661 to clone the SSL session 641. In some embodiments, the second core 662 requests a minimum set of information to reuse the SSL session 641. The first core 661 may send a minimal set of information to the second core 662 to clone the SSL session 641. The first core 661 may send one or more messages containing the set of information to clone the SSL session 641.

The first core 661 can use information related to the client certificate, for example, to determine the certificate authority status, issuer identifier of the certificate, and whether the certificate is valid and/or revoked. Client certificate information can facilitate authentication and/or authorization management in the cloned session. In some embodiments, a client certificate is used to support client authentication and/or SSL data insertion. In different embodiments, client certificate information can be of variable size.

The name or type of a cipher, including any configuration of the cipher, can allow the second core 662 to decode/encode/decrypt/encrypt data consistent with the SSL session 641. Cipher information can be sent in 32 bytes of information, although other embodiments can be supported. In addition, client authentication results can facilitate re-authentication of the client and/or allow bypass of some authentication steps. Client authentication results may also be used in policy-based authentication of the client 102, such as using one or more of the policies 656. Client authentication results can be sent in 4 bytes of information, although other embodiments can be supported.

The second core 662 may also request for the SSL version to clone a SSL network protocol stack and/or session data structure. The SSL version may also facilitate cloning of connections within the SSL network protocol stack as well as connections between any layer of the protocol stack with the client 102, server 106, and any other network component. SSL version information can be sent in 4 bytes of information, although other embodiments can be supported. In some embodiments, additional information or arguments for using the master key and/or other keys can be used to clone a SSL session. For example and in one embodiment, SSLv2 protocol may use a 8 bit key argument.

The first core 661 that owns the SSL session 641 may store information about session reuse by other cores. This information can be maintained as a bit-pattern, such as a bit pattern representing the cores of the multi-core system, in the session cache 651 or in memory 667. This information may also include a reference count of cloned sessions 641'. This information can be used for ageing the cloned sessions for timeout. On timeout of a cloned session 641', the non-owner core (for example, the second core 662) may send a message to the first core 661 indicating that the cloned session 641' has ended. In response to this message, the first core 661 may update the stored information, e.g., a reference count of cloned sessions. In one embodiment, the SSL session 641 may not be terminated if cloned sessions are active. In some embodiments, each core processes session ageing irrespective of whether the SSL session is a cloned or original session. Certain operations performed by a core described herein in various embodiments may be performed by a packet engine 240 of the core.

Figure 7A:
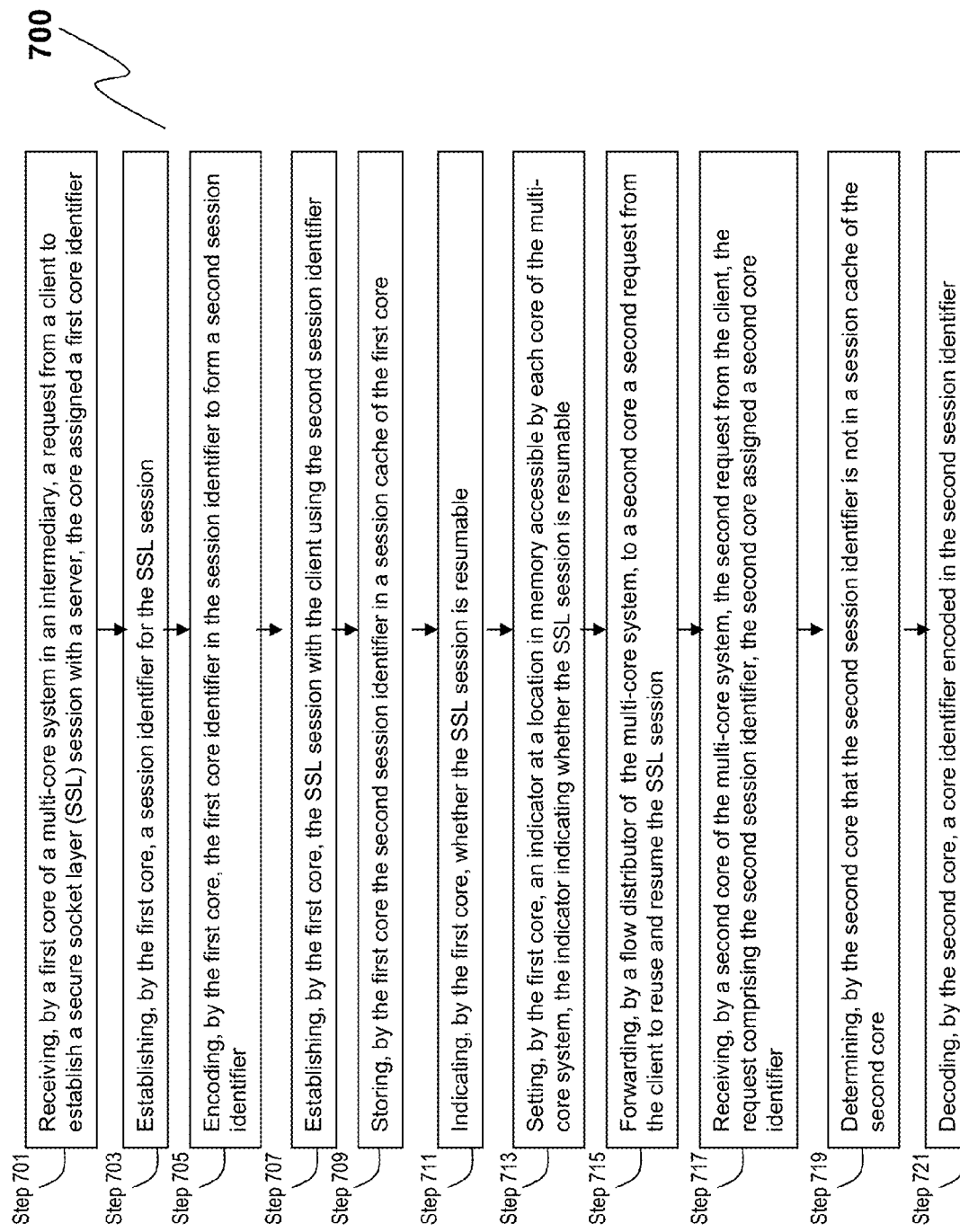
FIG. 7A-7B are flow diagrams of an embodiment of steps of a method for managing session persistence and reuse in a multi-core system.
Figure 7B:
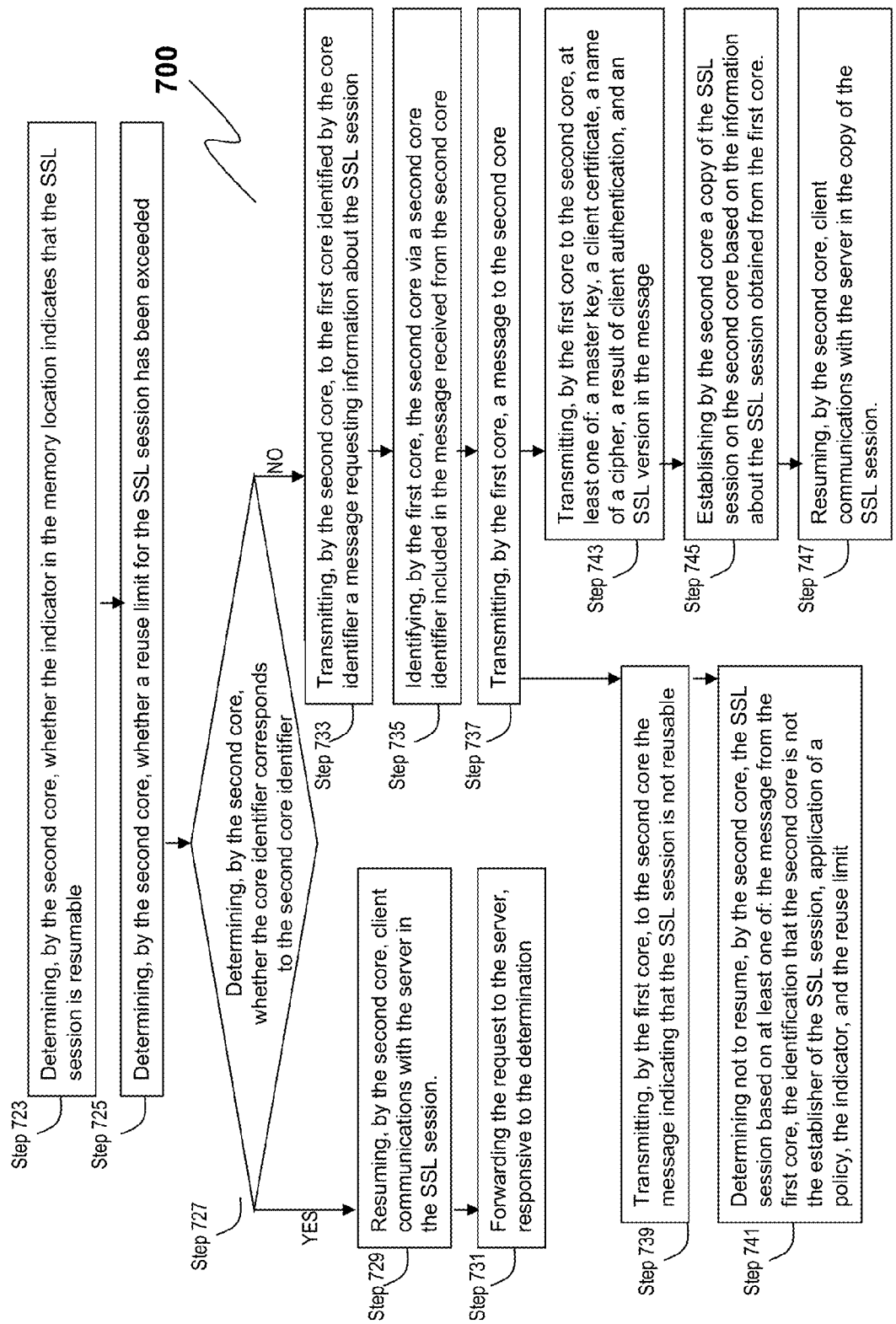

Referring now to FIGS. 7A and 7B, a flow diagram depicting an embodiment of steps of a method 700 for maintaining session persistence and reuse in a multi-core system is shown. In brief overview, at step 701, a first core of a multi-core system in an intermediary 200 receives a request 671 from a client 102 to establish a secure socket layer (SSL) session 641 with a server 106, the core 661 assigned a first core identifier 656. At step 703, the first core 661 establishes a session identifier for the SSL session 641. At step 705, the first core encodes the first core identifier 656 in the session identifier to form a second session identifier 688. At step 707, the first core 661 establishes the SSL session 641 with the client 102 using the second session identifier 688. At step 709, the first core 661 stores the second session identifier 688 in a session cache 651 of the first core 661. At step 711, the first core 661 indicates whether the SSL session 641 is resumable. At step 713, the first core 661 sets an indicator 668 at a location in memory 667 accessible by each core of the multi-core system, the indicator 668 indicating whether the SSL session 641 is resumable. At step 715, a flow distributor 550 of the multi-core system forwards a second request 672 from the client 102 to a second core 662 to reuse and resume the SSL session 641. At step 717, the second core 662 receives the second request 672 from the client 102, the request 672 comprising the second session identifier 688. The second core 662 is assigned a second core identifier 658. At step 719, the second core 662 determines that the second session identifier 688 is not in a session cache 652 of the second core 662.

At step 721, the second core 662 decodes a core identifier 656 encoded in the second session identifier 688. At step 723, the second core 662 determines whether the indicator 668 in the memory location indicates that the SSL session 641 is resumable. At step 725, the second core 662 determines whether a reuse limit 678 for the SSL session 641 has been exceeded. At step 727, the second core 662 determines whether the core identifier 658 corresponds to the second core identifier 658. At step 729, the second core 662 resumes client communications with the server 106 in the SSL session 641'. At step 731, the second core 662 forwards the request 672 to the server 106. At step 733, the second core 662 transmits a message requesting information about the SSL session 641 to the first core 661 identified by the core identifier 656. At step 735, the first core 661 identifies the second core 662 via a second core identifier 658 included in the message received from the second core 662. At step 737, the first core 661 transmits a message to the second core 662. At step 739, the first core 661 transmits to the second core 662 the message indicating that the SSL session 641 is not reusable. At step 741, the second core 662 determines not to resume the SSL session 641 based on at least one of: the message from the first core, the identification that the second core is not the establisher of the SSL session 641, application of a policy, the indicator 668, and the reuse limit 678. At step 743, the first core 661 transmits, to the second core 662, at least one of: a master key, a client certificate, a name of a cipher 631, a result of client authentication, and an SSL version in the message. At step 745, the second core 662 establishes a copy of the SSL session 641' on the second core 662 based on the information about the SSL session 641 obtained from the first core 661. At step 747, the second core 662 resumes client communications with the server 106 in the copy of the SSL session 641'.

In further details of step 701, a first core of a multi-core system in an intermediary receives a request from a client to establish a SSL session with a server. In one embodiment, a first core 661 of multi-core system deployed as an intermediary 200 between the client 102 and a server 106 receives a request 671 from a client 102 to establish a SSL session 641 with a server 106. In some embodiments, the first core 661 receives a client-hello message 671 from the client 102. The first core 661 may receive a first request 671 from the client 102 via the flow distributor 550. The first core 661 is assigned a first core identifier 656. The first core 661 may be assigned a core identifier 656 based on an identifier of a processing unit of the first core. In one embodiment, the first core 661 is assigned a one-byte core identifier 656. The multi-core system, the flow distributor 550, or other component of the intermediary 200 may generate and assign the first core identifier 656 to the first core 661. The first core identifier 656 may be generated via application of at least one policy 657.

The flow distributor 550 may identify the first core 661 based on information (e.g., TCP tuple) included in the request 671. For example, an in one embodiment, the flow distributor 550 calculates a hash value for the first request 671 based on information (e.g., TCP tuple) included in the request 671. The flow distributor may identify the first core 661 from the calculated hash value. The flow distributor 550 may determine that the first core 661 is active and/or available to handle the request 671. The flow distributor 550 may then forward the request 671 to the first core 661. The first core 661 can receive the request 671 via a transceiver 621 of the first core 661.

In further details of step 703, the first core establishes a session identifier for the SSL session. Responsive to receiving the request 671, the first core may parse, extract or otherwise process information from the request 671. The first core 661 may parse the request 671 for a session identifier, if available. In some embodiments, an absence of a session identifier in the request 671 indicates that the request 671 is a request for establishing a new SSL session. The first core 661 may perform authentication and/or authorization in connection with request 671, for example, by applying at least one policy 657.

In some embodiments, the server 106 generates the session identifier 668' for the SSL session 641. The first core 661 may obtain the session identifier 668' from the server 106. In other embodiments, the first core 661 may generate the session identifier 668' for the SSL session 641. The session identifier 668' may be generated via any program code, formulas or algorithms. In one embodiment, the server 106 and/or the first core 661 may generate a 16 byte session identifier 688'. In one embodiment, the server 106 and/or the first core 661 may generate a 32 byte session identifier 688'. In some embodiments, the server 106 and/or the first core 661 may reserve 4 byte of the session identifier 688' for timestamp information. The server 106 and/or the first core 661 may generate a random session identifier 688'. The server 106 and/or the first core 661 may generate a session identifier 688' using a cipher 631 and/or a random code generator. The server 106 and/or the first core 661 may apply at least one policy 657 in generating the session identifier 688'. During generation of the session identifier 688', The server 106 and/or the first core 661 may determine that the session identifier 688' is unique for the multi-core system. In some embodiments, the session identifier 668' is generated after the SSL session 641 is established. In other embodiments, the session identifier 668' is generated while the SSL session 641 is established.

In some embodiments, a SSL server or vserver generates the session identifier. In other embodiments, the client 102 generates the session identifier 688'. In some other embodiments, the session identifier 668' may be generated by a cipher 631 and/or an encryption engine 234.

In further details of step 705, the first core encodes the first core identifier 656 in the session identifier 688' to form a second session identifier 688. In some embodiments, the first core 661 uses an encoder/decoder pair or a cipher 631 to encode the first core identifier 656 in the session identifier 688' to form a second session identifier 688. The first core 661 may encode a byte of the session identifier 688' with the core identifier 656 to form the second session identifier 688. The first core 661 may encode the core identifier into a plurality of bits of the session identifier 688' to form the second session identifier 688. The first core 661 may determine at a predetermined frequency a predetermined set of one or more bytes of the session identifier 688' to encode to form the second session identifier 688. The first core 661 may determine a predetermined set of one or more bytes of the session identifier 688' to encode to form the second session identifier 688. The first core 661 may determine a predetermined set of one or more bits of the session identifier 688' to encode to form the second session identifier 688. The first core 661 may encode the core identifier 656 as a bit pattern in the session identifier 688. The first core 661 may set or unset a number of bits in the session identifier 688 to encode the core identifier 656.

The first core 661 may encode, with a block cipher, the core identifier 656 and a validity identifier with the session identifier 688' to form the second session identifier 688. The first core 661 may encode the core identifier 656 and/or a validity identifier with the session identifier 668' using a DES or 3DES cipher. The first core 661 may use 7 bytes of the session identifier 688' to encode the validity identifier. The first core 661 may use 8 bytes of the session identifier 688' to encode both the core identifier 656 and the validity identifier. The multi-core system, intermediary 200, a SSL server or a SSL vserver may generate the validity identifier.

In some embodiments, the first core 661 uses an encoder/decoder pair or a cipher 631 to encode the first core identifier and/or a validity identifier in the session identifier 688' to form a second session identifier 688. In some embodiments, the first core 661 executes program codes to encode the first core identifier 656 and/or a validity identifier in the session identifier 688' to form a second session identifier 688. The first core 661 may also perform mapping or apply hash functions on session identifier 688' before or after encoding. The second session identifier 688 may be a result of mapping, hash functions and/or encoding applied on the session identifier 688'. The first core 661 may randomly select a byte location in the session identifier to encode the core identifier. The first core 661 may randomly select byte locations in the session identifier to encode the validity identifier.

In further details of step 707, the first core establishes the SSL session 641 with the client using the second session identifier 688. The first core 661 may establish an SSL session 641 with a client responsive to the request 671. The first core 661 may establish an SSL session 641 with a client 102 responsive to successful authentication and/or authorization. The first core 661 may initiate handshaking operations with the client 102 and/or server 106, to establish one or more connections between the client 102 and the server 106. The first core 661 may negotiate a SSL version with the client 102 and/or the server 106. Upon reaching agreement of a SSL version, the first core 661 may establish a session protocol stack for a SSL session 641. The first core 661 may execute one or more drivers and/or agents in the protocol stack in establishing the protocol stack. The first core 661 may establish one or more connections between the client 102, server 106 and layers of the session protocol stack. In addition, the first core 661 may establish a session data structure for the SSL session 641.

The first core 611 may perform any of the steps of establishing the SSL session 641 via functionality provided by one or more of: the cipher 631, the encryption engine 234 and/or a SSL vserver executing on the first core 611 or on the multi-core system. In addition, the SSL session 641 may be generated based on application of at least one policy 657. The first core 611 may allocate memory for establishing and/or maintaining the SSL session 641. Further, the first core 611 may establish the session data structure for the SSL session 641. In some embodiment, the backend server 106 establishes the SSL session 641 on behalf of the first core 661.

In further details of step 709, the first core stores the second session identifier 688 in a session cache 651 of the first core 661. The first core 661 may create or allocate memory for a session cache 651 responsive to the request 671. The first core 661 may create or allocate memory for a session cache 651 responsive to successful authentication and/or authorization.

The first core 661 may create a session cache 651 for one or more SSL sessions associated with the first core 661. The first core 661 may create a session cache 651 in association with establishing a SSL session. In one embodiment, the first core 661 stores the second identifier 688 at a location in memory 667. The first core 661 may store the second identifier 688 in a private memory space of the first core 661. In one embodiment, the first core 661 stores the second identifier 688 at a location in shared memory 667 accessible by a plurality of cores.

In further details of step 711, the first core indicates whether the SSL session is resumable. In one embodiment, the first core 661 of a multi-core system indicates that an SSL session 641 established by the first core 661 is resumable or non-resumable. In another embodiment, the first core 661 of the multi-core system deployed as an intermediary 200 between the client 102 and a server 106 receives a notification that the SSL session 641 is resumable or non-resumable. The multi-core system or the flow distributor 550 may determine that the SSL session 641 is resumable or non-resumable. The SSL session 641 may be resumable or non-resumable based on a setting, preference or configuration associated with the client 102, the server 106 and/or the request 671. In still another embodiment, the first core 661 of the multi-core system deployed as an intermediary 200 between the client 102 and a server 106 determines that the SSL session 641 is resumable or non-resumable in accordance with a policy 656.

In some embodiments, the first core 661 identifies, via core identifiers included in requests for session information for the SSL session 641, one or more cores of the multi-core system that sent the requests. The first core 661 may receive these requests as CCM messages from other cores. The first core 661 may receive these requests from other cores responsive to a session disruption. The first core 661 may parse each request for a core identifier, each core identifier identifying a core that sent the request. The first core 661 can identify one or more cores based on a bit pattern of data stored on the first core 661. The first core 661 can identify one or more cores based on a bit pattern of data stored in the memory 667. The first core 661 can identify the one or more cores by comparing the core identifiers included in the requests with the bit pattern.

In some embodiments, the first core 661 transmits to each of the identified one or more cores of the multi-core system a message indicating that the SSL session 641 is resumable or non-resumable. The first core 661 may broadcast a message to each of the identified one or more cores indicating that the SSL session 641 is resumable or non-resumable. In some embodiments, the first core 661 sends a message to each of the identified one or more cores if a resumable indicator 668 is not available and/or not set.

In further details of step 713, the first core 661 sets an indicator 668 at a location in memory 667 accessible by each core of the multi-core system. The indicator 668 indicates whether the SSL session 641 is resumable. In one embodiment, responsive to the indication, the first core 661 sets an indicator 668 at a location in memory 667 accessible by each core of the multi-core system. The indicator 668 may indicate that the SSL session 641 is resumable or non-resumable. The indicator 668 may be referred to as a resumable indicator 668. The first core 661 may store, to the location in the memory 667, a value for a resumable field associated with the SSL session 641 as the indicator.

In further details of step 715, a flow distributor 550 of the multi-core system forwards a second request 672 from the client 102 to a second core 662 to reuse and resume the SSL session 641. In some embodiments, a flow distributor 550 (e.g., receive side scaler) of the multi-core system determines to forward the request 672 to the second core 662 based on a source port indicated by the request 672. The flow distributor 550 may receive the second request 672 from the client 102. The flow distributor 550 may receive the second request 672 after a disruption related to the SSL session 641. The flow distributor 550 may determine to forward the request 672 to the second core 662 based a non-availability of the first core 661. The flow distributor 550 may determine to forward the request 672 to the second core 662 based on a TCP tuple indicated by the request 672. The flow distributor 550 may determine to forward the request 672 to the second core 662 based on a hash index determined from a TCP tuple indicated by the request 672. The flow distributor 550 may determine to forward the request 672 to the second core 662 by associating the hash index with the second core 662.

In further details of step 717, the second core 662 receives the second request 672 from the client 102. The request comprises the second session identifier 688. In some embodiments, the second core 662 of the multi-core system deployed as an intermediary 200 between the client 102 and a server 106 receives the request 672 from the client 102 to resume the SSL session 641 with the server. The second core 662 is assigned a second core identifier 658. The multi-core system may assign the second core identifier 658 to the second core 662 based on an identifier of a processing unit of the second core 662. The multi-core system may assign the core a one-byte core identifier 658. The multi-core system may generate for the second core identifier 658 a random and/or unique core identifier in the multi-core system.

The second core 662 can receive, via a transceiver 622 of the second core 662, the second request 672. The second core 662 may receive the second request 672 from the flow distributor 550. The second core 662 may receive the second request 672 as a client-hello message. The second core 662 may receive the request 672 from a client 102 via a SSL session. For example, a connection between the client and the intermediary 200 may be maintained but a connection between the intermediary 200 and the server 106 may be disrupted. The second core 662 may receive the request 672 to resume and/or reuse the SSL session 641.

The second request 672 may comprise a session identifier 688. The second core 662 may parse, extract and/or decode a session identifier 688 from the second request 672. The second core 662 may parse, extract and/or decode this second session identifier 668 from the second request 672 responsive to receiving the second request 672. The second core 662 may decode the second session identifier 688 to extract a core identifier 656 and/or validity identifier from the session identifier 688. The second core 662 may apply mapping and/or hash functions on the session identifier 688 before or after the decoding.

In some embodiments, the decoding process includes applying mapping and/or hash functions on the session identifier 688. Application of mapping and/or hash functions may yield the original session identifier generated by the server 106 for the SSL session 641. The second core 662 may apply this original session identifier in communications with the server 106. The second core 662 may use this original session identifier to identify the server 106 and/or SSL session 641. In some embodiments, the second core 662 may check the session cache 652 against this original session identifier.

The second session identifier 688 may identify the first core 661 as an establisher or owner of the SSL session 641. The second core 662, may establish that the validity identifier is valid by accessing related information from memory 667, applying at least one policy 656, and/or communicating with at least one of: the first core 661, the flow distributor 550 and some other component of the intermediary 200.

In further details of step 719, and in one embodiment, the second core 662 determines that the second session identifier 688 is not in a session cache 652 of the second core 662. In another embodiment, the second core 662 determines that the second session identifier 688 is in a session cache 652 of the second core 662. Responsive to obtaining the second session identifier 688, the second core 662 may access at least one session cache 652 of the second core 662. The second core 662 may retrieve the at least one session cache 652 from memory 667. The second core 662 may retrieve information from the session cache 652, such as a session identifier, to compare against the second session identifier 688. Responsive to the comparison, the second core 662 can determine whether the second session identifier 688 is in a session cache 652 of the second core 662. In some embodiments, if the second session identifier 688 is in the session cache 652, the corresponding session is already associated with the second core 662. Consequently, the second core 622 can resume the session and resume client communications with the server 106 if other factors for resuming the session are met.

In further details of step 721, the second core decodes a core identifier 656 encoded in the second session identifier 688. The second core 662 may decode a second core identifier 656 from a byte of the second session identifier 688. The second core 662 may decode a predetermined byte of the second session identifier 688 to obtain the second core identifier 656. The second core 662 may apply a decoder to decode the second core identifier 656 to obtain the second session identifier 656. The second core 662 may apply a cipher 632 (e.g., a block cipher) to decode the second core identifier 656 to obtain the second session identifier 656. In other embodiments, the second core 662 may use a DES or a 3DES cipher. The second core 662 may decode the second core identifier 656 from a predetermined number of bits in the second session identifier 688.

In further details of step 723, the second core 662 determines whether the indicator 668 in the memory location indicates that the SSL session is resumable. The second core 662 processing a request 672 to reuse and/or resume a SSL session 641 may access the resumable indicator 668 to determine whether the SSL session 641 is resumable. The second core 662 may access the resumable indicator 668 from memory 667. The second core 662 may access a copy of the resumable indicator 668, for example, from the private memory space of the second core 662. The second core 662 may process the resumable indicator field or pointer destination to determine whether the SSL session 641 is resumable. In one embodiment, the second core 662 may determine that a resumable indicator 668 of the SSL session 641 does not exist or is not set. In some embodiments, the second core 622 receives a notification or message from the first core 661 or other component of the multi-core system on whether the SSL session 641 is resumable.

In one embodiment, the resumable indicator 668 and/or notification indicates that the SSL session 641 is non-resumable. In this embodiment, the second core 662 may determine not to resume the SSL session. Further details are described in connection with step 741. In another embodiment, the resumable indicator 668 and/or notification indicates that the SSL session 641 is resumable. In this embodiment, the second core 622 can resume the session and resume client communications with the server 106 if other requirements for resuming the session are met (see step 729).

In further details of step 725, the second core determines whether a reuse limit 678 for the SSL session has been exceeded. The second core 662 may access the memory 667 (e.g., shared memory space or private memory space) for a reuse limit 678. The second core 662 may set a reuse limit 678 for the SSL session 641, for example if a reuse limit 678 does not already exist. The second core 662 may compare the reuse limit 678 against a reuse history, counter or tracker. The second core 662 may access the memory 667 for the reuse history, counter or tracker.

In one embodiment, the second core 662 determines that the reuse limit 678 for the SSL session has been exceeded. In this embodiment, the second core 662 may determine not to resume the SSL session. Further details are described in connection with step 741. In another embodiment, the second core 662 determines that the reuse limit 678 for the SSL session has not been exceeded. Consequently, the second core 622 can resume the session and resume client communications with the server 106 if other requirements for resuming the session are met (see step 729).

In further details of step 727, the second core 662 determines whether the core identifier 656 corresponds to the second core identifier 658. In one embodiment, the second core 662 identifies from encoding of the second session identifier 688 that the second core 662 is not the establisher of the SSL session 641. For example, the second core 662 may determine that the core identifier 658 does not correspond to the second core identifier 656. In another embodiment, the second core 662 may identify from encoding of the second session identifier 688 that the first core 662 is the establisher of the SSL session 641. The second core 662 may send a message to the first core 661 to verify that the first core 662 is the establisher of the SSL session 641.

In still another embodiment, the second core 662 identifies from encoding of the second session identifier 688 that the second core 662 is the establisher of the SSL session. For example, the second core 662 may determine that the core identifier in the received session identifier matches the second core identifier 656. In this embodiment, the second core 622 can resume the session and resume client communications with the server 106 if other requirements for resuming the session are met (see step 729).

In further details of step 729, the second core 662 resumes client communications with the server 106 in the SSL session. If the core identifier 658 of the second core 662 corresponds to the second core identifier 656, the second core 662 may resume client communications with the server in the SSL session 641 if other requirements for resuming the session is met. If the second core 662 determines that the second core 662 is the establisher of the SSL session 641, the second core 662 may resume client communications with the server in the SSL session 641 if other requirements for resuming the session is met. In different embodiments, some or all of the following requirements must be met before the second core 662 can resume the SSL session 641:

i) the resumable indicator 668 (or a notification) indicates that the session is resumable;

ii) the reuse limit 678 is not exceeded;

iii) the session is not expired; and iv) the session is not corrupted.

In connection with resuming the session 741, the second core 662 may update one or more of the: resumable indicator 668, the reuse limit 678 and the associated session cache. The second core 662 may restart a portion of the session protocol stack and/or restore a connection of the SSL session 641 (e.g., a disrupted connection between the server 106 and the protocol stack). In addition, the second core 662 may send a message to the client 102. In some embodiments, the second core 662 may initiate handshaking with the client to resume the SSL session 741, and may include authentication and/or authorization process steps.

In further details of step 731, the second core 662 forwards the request 672 to the server 106. The second core 662 may resume communications with the server 106 responsive to resumption of the SSL session 641. In one embodiment, the second core 662 resumes client communications with the server 106 from the point of disruption of the SSL session 641. In some embodiments, the resumption of client communications is transparent or substantially transparent to one or more of: the user of the client, the client 102 and the server 106

In further details of step 733, the second core transmits a message requesting information about the SSL session 741 to the first core identified by the core identifier 656. The second core 662 may transmit to the core identified by the core identifier a message requesting information about the established SSL session 641. In some embodiments, the second core 662 determines that the second core 662 is not the establisher of the SSL session 641. Responsive to the determination, the second core 662 may transmit a request to the core 661 that established the SSL session 641. The second core 662 may transmit a request to verify that the first core is the establisher of the SSL session 641.

The second core 662 may transmit a request for information to reuse and clone the SSL session 641. The second core 662 may transmit a request for a minimum set of information to reuse and clone the SSL session 641 on the second core 662. The second core 662 may transmit a request for at least a partial copy of the session data structure of the SSL session 641. The second core 662 may transmit a request for at least a master key, a client certificate, a name of a cipher, a result of client authentication, and an SSL version to reuse and clone the SSL session 641. The second core 662 may transmit a request for a key processing argument, a CRL and/or TCP tuple information. The second core 662 may transmit the request or message as a CCM message.

In further details of step 735, the first core 661 identifies the second core 662 via a core identifier 658 included in the message received from the second core 662. In some embodiments, the first core 661 receives the message or request from the second core 662. The first core 661 may parse or extract a core identifier 658 from the message or request to identify the second core 662. Based on the identification, the first core 661 may respond to the second core 662.

In further details of step 737, the first core 661 transmits a message to the second core 662. The first core 661 may transmit a message to the second core 662 responsive to the request or message from the second core 662. The first core 661 may send a confirmation message to the second core 662 that the first core 661 is the establisher of the SSL session 641. Steps 739 and 743 describes other embodiments of the first core's responses.

In further details of step 739, the first core 661 transmits to the second core 662 the message indicating that the SSL session is not reusable or resumable. In some embodiments, this message is a CCM message. The first core 661 may transmit the message indicating that the SSL session is non-resumable based on the resumable indicator 668. The first core 661 may transmit the message indicating that the SSL session is non-resumable based on a notification that the first core 661 have received. The first core 661 may transmit the message indicating that the SSL session is not reusable based on a reuse limit 678 of the SSL session 641. The first core 661 may transmit the message indicating that the SSL session is not reusable or resumable based on an expiration of the SSL session 641. The first core 661 may transmit the message indicating that the SSL session is not reusable or resumable based on a determination that the SSL session 641 is corrupted. The first core 661 may transmit the message indicating that the SSL session is not reusable or resumable based on detecting an error message in the SSL session 641.

In further details of step 741, the second core determines not to resume the SSL session based on at least one of: the message from the first core, the identification that the second core is not the establisher of the SSL session, application of a policy, the indicator, and the reuse limit. The second core 662 may receive a message from the first core 661 indicating that the SSL session 641 is not reusable or resumable based on any of the reasons described in connection with step 739. The second core 662 may determine not to resume the SSL session 641 based on the message from the first core 661. The second core 662 may determine not to resume the SSL session 641 based on limited resources available on the second core 662.

The second core 662 may determine not to resume the SSL session 641 based on a determination that the second core 662 did not establish the SSL session 641. The second core 662 may determine whether a predetermined maximum reuse threshold (e.g., reuse limit 678) has been reached. The second core 662 may determine not to resume the SSL session 641 if the maximum reuse threshold is reached or exceeded. The second core 662 may determine not to resume the SSL session 641 in the absence of a reuse limit 678. The second core 662 may determine not to resume the SSL session 641 based on a determination that the SSL session 641 is non-resumable according to the resumable indicator 668.

In some embodiments, the second core 662 removes information about the SSL session 641 from a session cache 652 of the second core 662. The second core 662 may remove a session cache 652 of the second core 662. The second core 662 may remove the information and/or the session cache 652 responsive to a determination not to resume or reuse the SSL session 641. In some embodiments, the second core 662 establishes a new SSL session responsive to the client request 672. The second core may negotiate with the client 102 for a new SSL version and/or send a new session identifier to the client 102. Embodiments of details for establishing a new SSL session is described above in connection step 701.

In further details of step 743, the first core transmits, to the second core, at least one of: a master key, a client certificate, a name of a cipher, a result of client authentication, and an SSL version in the message. In one embodiment, the first core 661 transmits to the second core 662 a master key, a client certificate, a name of a cipher, a result of client authentication, and an SSL version. The first core 661 may also transmit information associated with key processing arguments, CRLs and TCP tuples. The first core 661 may send the second core 662 at least a portion of the session data structure of the SSL session 641.

The first core 661 may send the second core 662 any other information for resuming or reusing the SSL session 641. The first core 661 may send the second core 662 a minimum set of information for resuming or reusing the SSL session 641 in the second core 662. The first core 661 may send the second core 662 information for cloning or creating a copy of the SSL session 641 in the second core 662. The first core 661 may send any of these information to the second core 662 in one or more messages. The one or more messages may be sent via CCM. In some embodiments, the first core 661 may provide any of these information at a location in memory 667 for the second core 667 to access. The first core 661 may also provide the second core 662 a pointer or location to any of these information.

In further details of step 745, the second core establishes a copy of the SSL session 641' on the second core based on the information about the SSL session obtained from the first core. In some embodiment, the second core 662 establishes a clone or copy of the SSL session 641' using one or more steps substantially similar to establishing a new SSL session. The second core 662 may build a session data structure for the SSL session 641' from a partial data structure of the original SSL session 641 provided by the first core 661. The second core 662 may initiate handshaking steps with the client 102 and/or server 106. The handshaking steps may include any extent and combination of authentication, authorization, certificate validation/renewal, and key validation/renewal depending on the information provided by the first core 661.

The second core 662 may generate a session identifier 688' for the cloned SSL session 641'. The second core 662 may generate a session identifier 688' that is the same as the session identifier 688 for SSL session 641 except for the encoded bits for the core identifier. The second core 662 may encode the core identifier 658 of the second core 662 in the session identifier 688'. A validity identifier for the SSL session 641' may be issued and encoded in the session identifier 688'. The second core 662 may create a session cache 652 in connection with establishing the cloned SSL session 641'. The second core 662 may update the session cache 652 with the session identifier 688'. The second core 662 may create and/or update the session cache according to embodiments of steps described above in connection with FIG. 6 and steps 701 and 707.

The second core 662 may update the resumable indicator 668, reuse limit 678 and/or reuse count. The second core 662 may also send a message to the first core 661 indicating that the cloned session 641' is resumed. The first core 661 may update a record for tracking session reuse of the SSL session 641 amongst the plurality of cores. The first core 661 may maintain the original SSL session 641 if any corresponding cloned sessions 641' are active.

In further details of step 747, the second core 662 resumes client communications with the server 106 with the copy of the SSL session 641'. The second core 662 may resume client communications with the server 106 with the cloned SSL session 641' substantially similar to the steps described in connection with steps 729 and 731. The second core 662 may transmit a message to the client 102 and/or server 106 including the new session identifier 688' and core identifier 658. In one embodiment, the second core 662 resumes client communications with the server 106 from the point of disruption of the original SSL session 641. In some embodiments, the resumption of client communications is transparent or substantially transparent to one or more of: the user of the client, the client 102 and the server 106.

Although generally discussed with respect to a first and a second core, the techniques in this disclosure can apply to any cores of the multi-core system. Various embodiments of the methods may include any combination of the steps described. The systems and methods disclosed can apply to homogeneous and heterogeneous system. Homogeneous systems includes but are not limited to i) cores in a multi-core system, ii) a plurality of multi-core systems, and iii) servers in a server farm. Heterogeneous systems includes but are not limited to i) general purpose CPUs and application specific cores, ii) a network of machines of various types, iii) multi-core systems of different types and/or number of cores, and iv) server farms comprising machines of different types and/or number of machines.

In some embodiments, the systems and methods disclosed can be applied to cluster deployment where session cloning is performed across homogenous or heterogeneous systems. In one embodiment, a plurality of sessions in a first multi-core system may be cloned in a second multi-core system. In other embodiments, session information and parameters may be reused across homogenous or heterogeneous systems. In some embodiments, SSL security parameters may be transferred across homogenous or heterogeneous systems. Some or all of a set of SSL security parameters may be copied, regenerated, or otherwise reused in one or more cores or machines. Examples of SSL security parameters include identification of a secure port for SSL connection, the level or strength of encryption, the interval for session renegotiation, enablement of host matching and location of private key. Furthermore, reuse may include, but are not limited to, information and/or parameters related to keys, encryption, certificates, ciphers, authentication results and SSL version. Embodiments of these information and/or parameters are described above in connection with FIG. 6.

The systems and methods disclosed can also be applied to state-full SSL session failover in homogenous or heterogeneous systems. In some embodiments, Active-Standby deployment may be available where a SSL session established on an active node is cloned on a standby node. When failover happens, the standby node can take over as the active node. The SSL clients may not need to re-negotiate the SSL session as the new Active node already have the complete cloned session. The systems and methods disclosed can be further applied to external heterogeneous systems, such as those with well-defined authentication processes in place to identify the external device performing session cloning.

G. Systems and Methods for Providing a Distributed Cluster Architecture

As discussed earlier, to overcome limitations on transistor spacing and CPU speed increases, many CPU manufacturers have incorporated multi-core CPUs to improve performance beyond that capable of even a single, higher speed CPU. Similar or further performance gains may be made by operating a plurality of appliances, either single or multi-core, together as a distributed or clustered appliance. Individual computing devices or appliances may be referred to as nodes of the cluster. A centralized management system may perform load balancing, distribution, configuration, or other tasks to allow the nodes to operate in conjunction as a single computing system. Externally or to other devices, including servers and clients, in many embodiments, the cluster may be viewed as a single virtual appliance or computing device, albeit one with performance exceeding that of a typical individual appliance.

Figure 8:
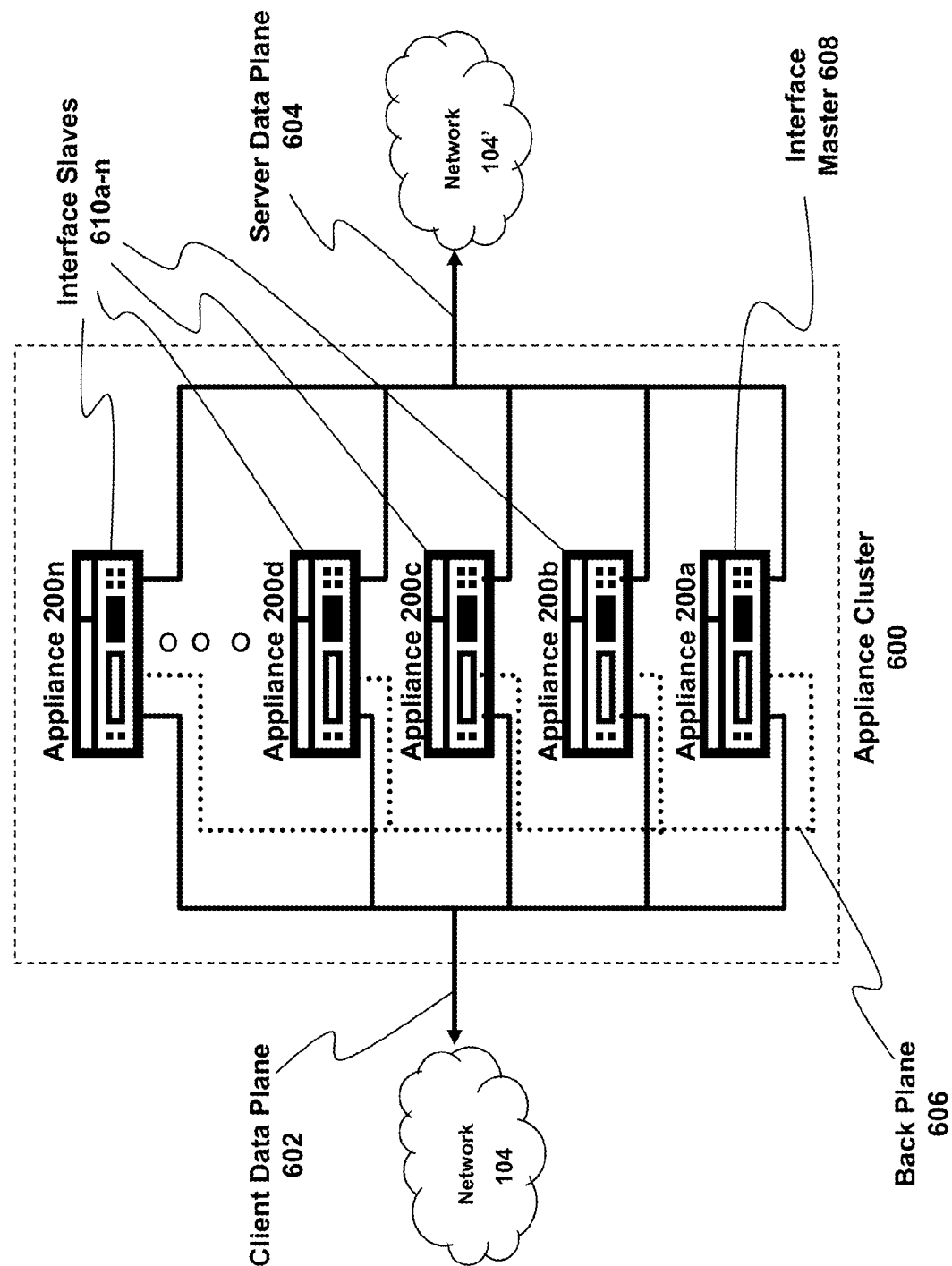
FIG. 8 is a block diagram of an embodiment of a cluster system.

Referring now to FIG. 8, illustrated is an embodiment of a computing device cluster or appliance cluster 600. A plurality of appliances 200a-200n or other computing devices, sometimes referred to as nodes, such as desktop computers, servers, rackmount servers, blade servers, or any other type and form of computing device may be joined into a single appliance cluster 600. Although referred to as an appliance cluster, in many embodiments, the cluster may operate as an application server, network storage server, backup service, or any other type of computing device without limitation. In many embodiments, the appliance cluster 600 may be used to perform many of the functions of appliances 200, WAN optimization devices, network acceleration devices, or other devices discussed above.

In some embodiments, the appliance cluster 600 may comprise a homogenous set of computing devices, such as identical appliances, blade servers within one or more chassis, desktop or rackmount computing devices, or other devices. In other embodiments, the appliance cluster 600 may comprise a heterogeneous or mixed set of devices, including different models of appliances, mixed appliances and servers, or any other set of computing devices. This may allow for an appliance cluster 600 to be expanded or upgraded over time with new models or devices, for example.

In some embodiments, each computing device or appliance 200 of an appliance cluster 600 may comprise a multi-core appliance, as discussed above. In many such embodiments, the core management and flow distribution methods discussed above may be utilized by each individual appliance, in addition to the node management and distribution methods discussed herein. This may be thought of as a two-tier distributed system, with one appliance comprising and distributing data to multiple nodes, and each node comprising and distributing data for processing to multiple cores. Accordingly, in such embodiments, the node distribution system need not manage flow distribution to individual cores, as that may be taken care of by a master or control core as discussed above.

In many embodiments, an appliance cluster 600 may be physically grouped, such as a plurality of blade servers in a chassis or plurality of rackmount devices in a single rack, but in other embodiments, the appliance cluster 600 may be distributed in a plurality of chassis, plurality of racks, plurality of rooms in a data center, plurality of data centers, or any other physical arrangement. Accordingly, the appliance cluster 600 may be considered a virtual appliance, grouped via common configuration, management, and purpose, rather than a physical group.

In some embodiments, an appliance cluster 600 may be connected to one or more networks 104, 104'. For example, referring briefly back to FIG. 1A, in some embodiments, an appliance 200 may be deployed between a network 104 joined to one or more clients 102, and a network 104' joined to one or more servers 106. An appliance cluster 600 may be similarly deployed to operate as a single appliance. In many embodiments, this may not require any network topology changes external to appliance cluster 600, allowing for ease of installation and scalability from a single appliance scenario. In other embodiments, an appliance cluster 600 may be similarly deployed as shown in FIGS. 1B-1D or discussed above. In still other embodiments, an appliance cluster may comprise a plurality of virtual machines or processes executed by one or more servers. For example, in one such embodiment, a server farm may execute a plurality of virtual machines, each virtual machine configured as an appliance 200, and a plurality of the virtual machines acting in concert as an appliance cluster 600. In yet still other embodiments, an appliance cluster 600 may comprise a mix of appliances 200 or virtual machines configured as appliances 200. In some embodiments, appliance cluster 600 may be geographically distributed, with the plurality of appliances 200 not co-located. For example, referring back to FIG. 8, in one such embodiment, a first appliance 200a may be located at a first site, such as a data center and a second appliance 200b may be located at a second site, such as a central office or corporate headquarters. In a further embodiment, such geographically remote appliances may be joined by a dedicated network, such as a T1 or T3 point-to-point connection; a VPN; or any other type and form of network. Accordingly, although there may be additional communications latency compared to co-located appliances 200a-200b, there may be advantages in reliability in case of site power failures or communications outages, scalability, or other benefits. In some embodiments, latency issues may be reduced through geographic or network-based distribution of data flows. For example, although configured as an appliance cluster 600, communications from clients and servers at the corporate headquarters may be directed to the appliance 200b deployed at the site, load balancing may be weighted by location, or similar steps can be taken to mitigate any latency.

Still referring to FIG. 8, an appliance cluster 600 may be connected to a network via a client data plane 602. In some embodiments, client data plane 602 may comprise a communication network, such as a network 104, carrying data between clients and appliance cluster 600. In some embodiments, client data plane 602 may comprise a switch, hub, router, or other network devices bridging an external network 104 and the plurality of appliances 200a-200n of the appliance cluster 600. For example, in one such embodiment, a router may be connected to an external network 104, and connected to a network interface of each appliance 200a-200n. In some embodiments, this router or switch may be referred to as an interface manager, and may further be configured to distribute traffic evenly across the nodes in the application cluster 600. Thus, in many embodiments, the interface master may comprise a flow distributor external to appliance cluster 600. In other embodiments, the interface master may comprise one of appliances 200a-200n. For example, a first appliance 200a may serve as the interface master, receiving incoming traffic for the appliance cluster 600 and distributing the traffic across each of appliances 200b-200n. In some embodiments, return traffic may similarly flow from each of appliances 200b-200n via the first appliance 200a serving as the interface master. In other embodiments, return traffic from each of appliances 200b-200n may be transmitted directly to a network 104, 104', or via an external router, switch, or other device. In some embodiments, appliances 200 of the appliance cluster not serving as an interface master may be referred to as interface slaves.

The interface master may perform load balancing or traffic flow distribution in any of a variety of ways. For example, in some embodiments, the interface master may comprise a router performing equal-cost multi-path (ECMP) routing with next hops configured with appliances or nodes of the cluster. The interface master may use an open-shortest path first (OSPF) In some embodiments, the interface master may use a stateless hash-based mechanism for traffic distribution, such as hashes based on IP address or other packet information tuples, as discussed above. Hash keys and/or salt may be selected for even distribution across the nodes. In other embodiments, the interface master may perform flow distribution via link aggregation (LAG) protocols, or any other type and form of flow distribution, load balancing, and routing.

In some embodiments, the appliance cluster 600 may be connected to a network via a server data plane 604. Similar to client data plane 602, server data plane 604 may comprise a communication network, such as a network 104', carrying data between servers and appliance cluster 600. In some embodiments, server data plane 604 may comprise a switch, hub, router, or other network devices bridging an external network 104' and the plurality of appliances 200a-200n of the appliance cluster 600. For example, in one such embodiment, a router may be connected to an external network 104', and connected to a network interface of each appliance 200a-200n. In many embodiments, each appliance 200a-200n may comprise multiple network interfaces, with a first network interface connected to client data plane 602 and a second network interface connected to server data plane 604. This may provide additional security and prevent direct interface of client and server networks by having appliance cluster 600 server as an intermediary device. In other embodiments, client data plane 602 and server data plane 604 may be merged or combined. For example, appliance cluster 600 may be deployed as a non-intermediary node on a network with clients 102 and servers 106. As discussed above, in many embodiments, an interface master may be deployed on the server data plane 604, for routing and distributing communications from the servers and network 104' to each appliance of the appliance cluster. In many embodiments, an interface master for client data plane 602 and an interface master for server data plane 604 may be similarly configured, performing ECMP or LAG protocols as discussed above.

In some embodiments, each appliance 200a-200n in appliance cluster 600 may be connected via an internal communication network or back plane 606. Back plane 606 may comprise a communication network for inter-node or inter-appliance control and configuration messages, and for inter-node forwarding of traffic. For example, in one embodiment in which a first appliance 200a communicates with a client via network 104, and a second appliance 200b communicates with a server via network 104', communications between the client and server may flow from client to first appliance, from first appliance to second appliance via back plane 606, and from second appliance to server, and vice versa. In other embodiments, back plane 606 may carry configuration messages, such as interface pause or reset commands; policy updates such as filtering or compression policies; status messages such as buffer status, throughput, or error messages; or any other type and form of inter-node communication. In some embodiments, RSS keys or hash keys may be shared by all nodes in the cluster, and may be communicated via back plane 606. For example, a first node or master node may select an RSS key, such as at startup or boot, and may distribute this key for use by other nodes. In some embodiments, back plane 606 may comprise a network between network interfaces of each appliance 200, and may comprise a router, switch, or other network device (not illustrated). Thus, in some embodiments and as discussed above, a router for client data plane 602 may be deployed between appliance cluster 600 and network 104, a router for server data plane 604 may be deployed between appliance cluster 600 and network 104', and a router for back plane 606 may be deployed as part of appliance cluster 600. Each router may connect to a different network interface of each appliance 200. In other embodiments, one or more planes 602-606 may be combined, or a router or switch may be split into multiple LANs or VLANs to connect to different interfaces of appliances 200a-200n and serve multiple routing functions simultaneously, to reduce complexity or eliminate extra devices from the system.

In some embodiments, a control plane (not illustrated) may communicate configuration and control traffic from an administrator or user to the appliance cluster 600. In some embodiments, the control plane may be a fourth physical network, while in other embodiments, the control plane may comprise a VPN, tunnel, or communication via one of planes 602-606. Thus, the control plane may, in some embodiments, be considered a virtual communication plane. In other embodiments, an administrator may provide configuration and control through a separate interface, such as a serial communication interface such as RS-232; a USB communication interface; or any other type and form of communication. In some embodiments, an appliance 200 may comprise an interface for administration, such as a front panel with buttons and a display; a web server for configuration via network 104, 104' or back plane 606; or any other type and form of interface.

In some embodiments, as discussed above, appliance cluster 600 may include internal flow distribution. For example, this may be done to allow nodes to join/leave transparently to external devices. To prevent an external flow distributor from needing to be repeatedly reconfigured on such changes, a node or appliance may act as an interface master or distributor for steering network packets to the correct node within the cluster 600. For example, in some embodiments, when a node leaves the cluster (such as on failure, reset, or similar cases), an external ECMP router may identify the change in nodes, and may rehash all flows to redistribute traffic. This may result in dropping and resetting all connections. The same drop and reset may occur when the node rejoins. In some embodiments, for reliability, two appliances or nodes within appliance cluster 600 may receive communications from external routers via connection mirroring.

In many embodiments, flow distribution among nodes of appliance cluster 600 may use any of the methods discussed above for flow distribution among cores of an appliance. For example, in one embodiment, a master appliance, master node, or interface master, may compute a RSS hash, such as a Toeplitz hash on incoming traffic and consult a preference list or distribution table for the hash. In many embodiments, the flow distributor may provide the hash to the recipient appliance when forwarding the traffic. This may eliminate the need for the node to recompute the hash for flow distribution to a core. In many such embodiments, the RSS key used for calculating hashes for distribution among the appliances may comprise the same key as that used for calculating hashes for distribution among the cores, which may be referred to as a global RSS key, allowing for reuse of the calculated hash. In some embodiments, the hash may be computed with input tuples of transport layer headers including port numbers, internet layer headers including IP addresses; or any other packet header information. In some embodiments, packet body information may be utilized for the hash. For example, in one embodiment in which traffic of one protocol is encapsulated within traffic of another protocol, such as lossy UDP traffic encapsulated via a lossless TCP header, the flow distributor may calculate the hash based on the headers of the encapsulated protocol (e.g. UDP headers) rather than the encapsulating protocol (e.g.

TCP headers). Similarly, in some embodiments in which packets are encapsulated and encrypted or compressed, the flow distributor may calculate the hash based on the headers of the payload packet after decryption or decompression. In still other embodiments, nodes may have internal IP addresses, such as for configuration or administration purposes. Traffic to these IP addresses need not be hashed and distributed, but rather may be forwarded to the node owning the destination address. For example, an appliance may have a web server or other server running for configuration or administration purposes at an IP address of 1.2.3.4, and, in some embodiments, may register this address with the flow distributor as its internal IP address. In other embodiments, the flow distributor may assign internal IP addresses to each node within the appliance cluster 600. Traffic arriving from external clients or servers, such as a workstation used by an administrator, directed to the internal IP address of the appliance (1.2.3.4) may be forwarded directly, without requiring hashing.

G. Systems and Methods for SSL Session Management in a Cluster System

In some aspects, the present disclosure is directed towards methods and systems for SSL session management in a cluster system. A device, appliance, network or intermediary between one or more client and servers, may include a cluster or group of nodes (hereafter sometimes generally referred to as an "intermediary", "cluster" or "cluster system"). Each of these nodes may comprise a multi-core system and may host one or more processing engines (PEs) for handling packets. The present methods and systems can efficiently manage SSL sessions established across nodes and/or cores, including nodes having symmetric or asymmetric configuration. By interoperating between nodes within the cluster system, the nodes can present a single node image to a user or device interfacing with the cluster system. These methods and systems can use a distributed hash table (DHT), that may allow any core receiving a session resume/reuse request, to identify an owner code of the requested session. The distributed hash table can receive as input a key derived from a session identifier, to output information about the owner core. Copies of the distributed hash table may be available to each core and/or node, and can be used to mark particular sessions that may be invalid or non-resumable. Based on the has table, the receiving core may request for session information related to the requested session. The receiving core may then establish a local cloned session of the requested session, responsive to the session resume/reuse request.

Figure 9A:
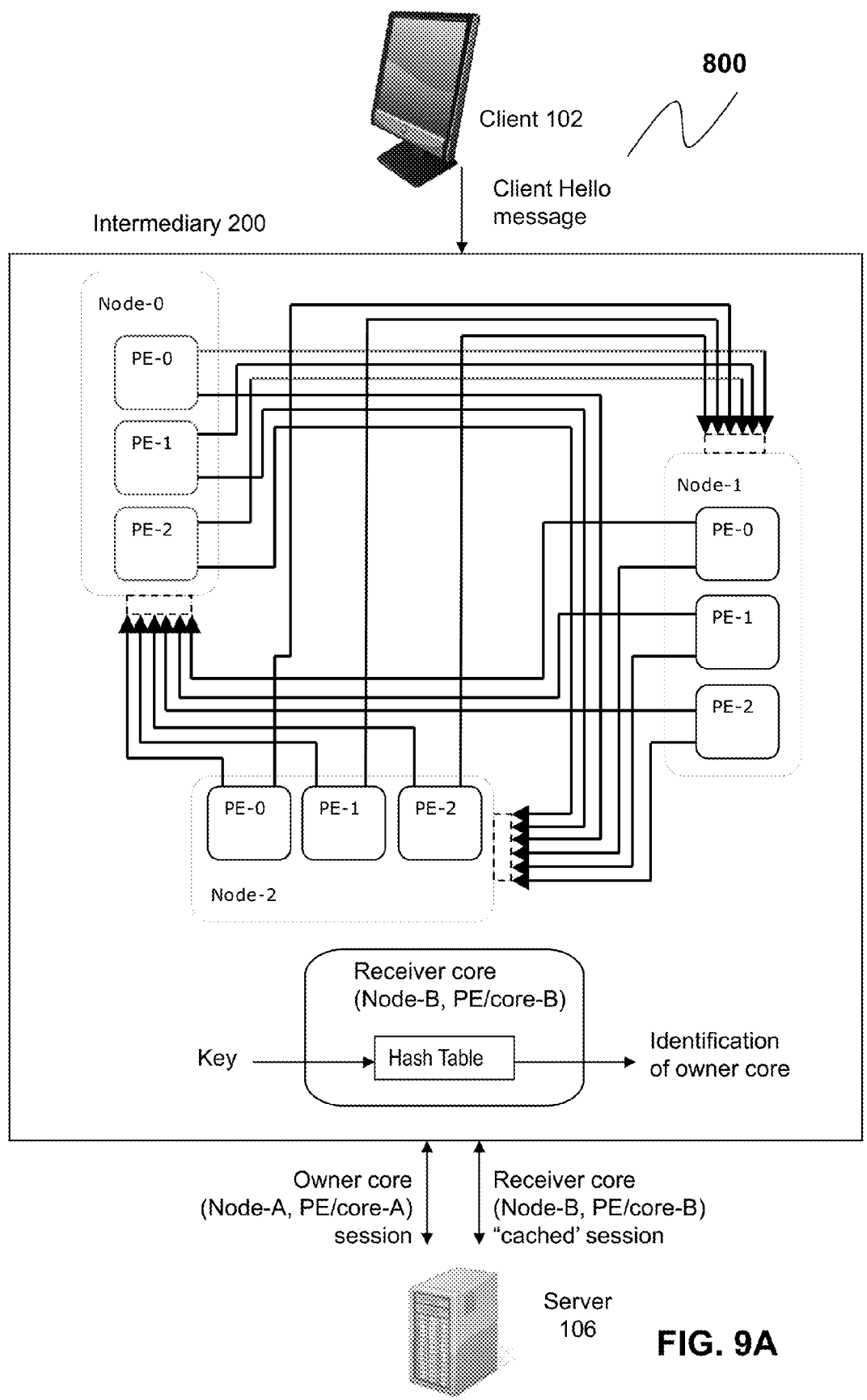
FIG. 9A is a block diagram of an embodiment of a system for managing one or more secure socket layer (SSL) sessions.

Referring now to FIG. 9A, one embodiment of a system for SSL session management in a cluster system is depicted. In brief summary, the system includes an intermediary 200, comprising a cluster system, that facilitates and/or processes communications between a client 102 and a server 106 over at least one communication session. The cluster may comprise any embodiment of features described above in connection with FIG. 8. Each node of the cluster may include a plurality of cores or packet processing engines (PEs), such as various embodiments of the cores or PEs described above in connection with sections B-G. Each core may include a hash table, which may comprise a copy or a portion of a distributed hash table (DHT) maintained within the cluster.

In some embodiments, each node of the cluster may comprise one or more functionality of an appliance having multi-core features, such as embodiments of appliances 200 described above in connection with at least FIGS. 5A-5C, 6 and 7A-7B. A pair of nodes may communicate or exchange messages between themselves using node-to-node (N2N) messages, as discussed in section G. Each core or PE of a node may establish and/or maintain a N2N channel or connection to each of the other nodes. The configuration of the nodes may not be symmetric. For example, some nodes may comprise a larger number of cores and/or have access to different resources, or may comprise cores of different performance and/or features than those of certain other nodes.

In some aspects, SSL session management may require particular attention or handling in a cluster-based system or architecture. A SSL session data structure can hold information that can be used to allow resumption or cloning of existing SSL sessions. A SSL session data structure can be built or replicated using certain session data that may be stored in a DHT. In some embodiments of the present systems, SSL session resumption or reuse may be commonly used, for example, in applications involving secure communication. SSL session resumption or reuse may be used to reduce processing or communications load on a web-server, e.g., by avoiding or reducing full handshake processing.

In certain embodiments of a cluster system, SSL sessions created or established on a particular core of a node may be private to, or reserved for that core. Other cores of the same node, as well as of different nodes, may not be able to have direct access to session data and/or session states of such an SSL session. Certain embodiments of the system may employ or be subject to processes or features that direct or distribute incoming packets or requests across nodes and/or cores of the intermediary. By way of illustration, and not intended to be limiting in any way, the system may comprise RSS features (e.g., as described above in connection with at least FIG. 5B) and/or CITRIX data flow diagram (DFD) features. Such features may make it likely for, or result in session resume/reuse requests or connections going to a different core, e.g., (node, core) pair, than the one (owner core) which established or allocated the session. For example, RSS and/or DFD may distribute packet or message load across nodes and/or cores of the cluster system, and may do so without regards to (e.g., without the ability to determine) the identity of the corresponding owner nodes and/or cores.

In certain embodiments, the intermediary provides a mechanism to identify the owner (node, core). The latter may sometimes be referred to as an owner node of a session, so that a core of the node may own or handle the session at the core level. The owner (node, core) may sometimes be referred to as an owner core of a session, such that the core (owning or handling the session at the core level) may belong to a node referred as an owner node (owning or handling the session at the node level). More generally, a (node, core) may sometimes be referred to by the corresponding node or core, and it should be understood that a referenced node would have an associated core, and a referenced core would have an associated node.

A (node, core) may receive a session resume/reuse/cloning request (hereafter sometimes generally referred to as a "request"). Such a (node, core) may hereafter sometimes generally be referred to as a "receiving core". The request may include a session identifier for a requested session. The request may include a request to access a particular session, e.g., established with a server, or to be established with the server. The request may include a request to access features and/or resources provided by or available through a session, but may not necessarily comprise a request to access the requested session itself. The request may include a request to clone, reuse and/or resume a session, e.g., resume a session that was established by another node and/or core, or to reuse a session established at the receiving core. The cloning and/or resumption of a requested session on a non-owner node and/or core may involve having the cloned/reused/resumed session incorporating or making available certain features and/or resources provided by or available through the requested session.

In some embodiments, the request includes a Client-Hello message, or other handshaking message or packet. The request may include a message sent or conveyed from a client to the server and/or intermediary. The request may include a message for accessing and/or establishing a session or connection of any type or form (e.g., a SSL session) with the server and/or intermediary. The request may include a session identifier, which can include any type or form of information for identifying a session and/or a type of session. The request may include a request for information that an owner (node, core) may provide to an non-owner (node, core), e.g., to replicate a session structure consistent or compatible with a particular session or session identifier (hereafter sometimes referred to as "session-ID").

By identifying the owner (node, core) for a given session-ID, the cluster system can apply its N2N message passing mechanism to receive information, enabling a receiving core to make or establish a copy or clone of the session. The receiving core may establish the copy or clone locally, e.g., in or from the receiving core. The receiving core may establish the copy or clone in or from a cache of the requesting core.

The intermediary may include a hash table mechanism for identifying an owner of a session. The intermediary may, in certain embodiments, include a distributed hash table (DHT). The intermediary may include a shared hash table, e.g., in shared memory, which may be shared or accessible by nodes and/or cores. In some embodiments, a DHT comprises a mechanism, data structure, infrastructure or system for storing and/or retrieving data regarding sessions (e.g., session identifier, ownership information, and session status such as validity, resumability/reusability). Each core of a node may have its own DHT table, or a copy of the DHT. Each data item in a DHT may be indexed by an unique key. The unique key may be specified (e.g., in form and/or in value) by an application which uses the DHT. For example, in an SSL application, a packet engine (PE) establishing or accessing a session may access or interface with a DHT using one or more predefined APIs, which may be provided by the DHT.

In some embodiments, a pair of <data, key> is called a DHT entity. DHT entities may be stored in a DHT table. The data may include any information about a session, such as owner core identification and/or information for cloning a session. A DHT can identify, determine or compute the identity of an owner of an entity (or session) based on the key. By having local or distributed copies of the DHT at each (node, core), applications using DHT may not have to be aware of a location (e.g., shared location) for fetching and/or storing the data that can be accessed. By way of example, various operations can be made on a DHT, including but not limited to the following embodiments:

Dht_put(key, data): Stores the data on (or in association with) the owner (node, core).

Dht_get(key,): Fetches the data from (or in association with) the owner (node, core).

Dht_entry_delete(dht_entry): Deletes the dht_entry associated with the application's structure.

Dht_update(Key, Oldvalue, Newvalue): Updates Oldvalue with Newvalue on all or some of the (node, core), e.g., where ever (Key, Oldvalue) exists.

In some embodiments, a receiving core (sometimes referred to as a requesting core) can form or generate a key based at least in part on a session-ID (e.g., received from the client in the request). The receiving core can form or generate a key based at least in part on a unique identifier value of a vserver, VIP, packet processing engine or PE on which the receiving core received the request. For example, the receiving core may apply a predefined transformation or encoding function/scheme to any of the information to form a key.

In certain embodiments, the data portion of a DHT entity may include one or more of (e.g., at least) the following information, though not limited to these:

session->master_key[48]

Client certificate, (e.g., if client Authentication along with SSL data insertion is enabled on the SSL vserver/service). Data insertion related to client certificate may require copying of the client certificate. This may be variable in size, and may involve additional overheads.

Identification of a method or means to recreate the session->cipher pointer. For example, this may include a name of a cipher passed in the core-to-core (or N2N) message. This information may comprise 32 bytes of data.

Session->verify_result: This may hold or specify a result of client authentication, and may be used in policy-based client authentication. This information may comprise 4 bytes of data.

Session->ssl_version: This may hold or specify a version of SSL negotiated for the session. This information may comprise u16 bits of data.

Session->key_arg[8]: This may be used in SSLv2 protocol.

The following is a non-limiting illustration of one embodiment of formats and/or data structures for keys and data (e.g., that can be used with DHT APIs for SSL):

```
typedef struct ssl_sess_dht_key
{
    u16bits version;
    u64bits uniq_id;
    u08bits session_id_length;
    u08bits session_id[SSL_MAX_SSL_SESSION_ID_LENGTH];
}ssl_sess_dht_key_t;
```

Data (e.g., transferred for session cloning):

```
typedef struct ssl_sess_dht_st {
    u32bits size;
    u32bits verify_result;
    u32bits cipher_id;
    u32bits peercertlen;
    u32bits d_flags;
    u08bits key_arg[SSL_MAX_KEY_ARG_LENGTH]; /* 8 */
    u8bits master_key[SSL_MAX_MASTER_KEY_LENGTH]; /* 48 */
    u16bits flags;
    u16bits ssl_version;
    u16bits sni_len;
    u16bits master_key_length;
    u08bits key_arg_length;
    u08bits cert_index;
}ssl_sess_dht_t;
```

In certain embodiments, session creation or resumption/reuse using a DHT within a cluster system may involve a number of steps that may be different from that of a mere or typical multi-core system. Some or all of the following steps may be described with respect to a front-end side (e.g., between a client 102 and the intermediary). In general for example, upon receiving a new SSL connection request (e.g., native Client-Hello, or Client-Hello with no session-ID), the cluster system may create and/or assign a new session-ID responsive to the request. The cluster system may (e.g., call an operation, dht_puhkey, data) to) install the requested session on the owner (node, core), e.g., the core that was assigned or received the request for the (new) session.

On receiving a session resume/reuse request (e.g., a Client-Hello with session-ID), the cluster system or receiving core may perform one or more of the following. If the requested session is present or identified on a local cache of the receiving core, the receiving core may proceed to reuse the session. The receiving core may increment the reuse count, e.g., to indicate the reuse/resumption of the session. If the requested session is not present or identified on a local cache of the receiving core, the cluster system or receiving core may (e.g., call an operation, dht_get(KEY) to) determine if the requested session is present or available on the owner (node, core).

If the requested session is present or available on the owner (node, core) (e.g., if the dht_get response is positive), it may mean that the owner (node, core) still maintains the session, and the owner may provide (e.g., in the response) session information for performing a resumption of the session on the current (node, core). If the requested session is not present or available on the owner (node, core) (e.g., if the dht_get response is negative), the session may have expired on the owner (node, core). In this case, the current or receiving core can issue a new session-ID, may establish a session corresponding to the session-ID, and may add the session-ID to the core's own cache. The receiving core may (e.g., invoke an operation, dht_put(KEY,DATA) to) install the session on the owner (node, core).

Each session structure may be associated with a DHT entry in a DHT. If a session is to be freed or to expire, the cluster system or owner core may (e.g., use the DHT API to) delete the DHT entry, which may be updated to copies of the DHT at each (node, core). In some embodiments, an owner session is a session which is installed by DHT using a dht_put operation. Other sessions may be referred to as cached sessions or cloned sessions. As discussed above, the core that establishes or installs a session (e.g., calls the dht_put operation) may not be the owner of the session. Ownership of a session may be determined by a DHT based on the particular key (e.g., formed by a receiving core).

In some embodiments, cached sessions are created or established in response to an action of an non-owner receiving core (e.g., via the dht_get(key) operation). A cached session may send heart beat signals, or any other type of indication, to the corresponding owner session or owner (node, core). This may ensure that the owner session is not deleted when it has cloned references (sessions) at other nodes or cores. Thus, at any time for a given owner session, there may exist multiple cached sessions.

In some embodiments, on the backend side (e.g., between the intermediary and the server 106), the intermediary (e.g., a Netscalar node) may be the SSL client. A SSL web server or the server 106 may issue a session-ID or session identifier. Each core (e.g., of the cluster system) may open a session to the backend server. There may be no requirement for session-cloning. Each core may try to reuse the session to a backend server (e.g., for a predetermined limit, such as a maximum of 100 times or instances).

In session resume, a cluster system may clone a SSL session across cores. On receiving a session reuse/resume request on a receiving core, the core may check for the session in the receiving core's local cache. If the session exists on the same core, the session may be reused. If not, the session may be cloned (e.g., copied) from the owner (node, core) to the receiving or current (node, core). As discussed, DHT may be used to facilitate or perform the cloning, e.g., by invoking the dht_get(key) operation. Cloning may not mean that an entire SSL session data structure has to be copied. The cluster system may need to copy only required or minimal information from the session data structure to honor the session resumption. For example, the owner (node, core) may perform a DHT lookup using the key as formed and received from the requesting core. The owner core may generate and send a response comprising data (e.g., minimal data) to recreate a requested session structure or features. In some embodiments, session cloning may fail if the requested session does not exist (e.g., has expired) on the owner (node, core).

In certain embodiments, each core may perform (e.g., its own) session ageing, which may be irrespective of whether the corresponding session is local or copied from an owner core. The cluster system or owner core may invoke a "session free" function when references (e.g., all SPCB references) to the session have ceased or become zero. When a "session free" function is called, a call may be made to an operation (e.g., to a DHT API dht_entry_delete operation) to check whether a DHT pointer associated with the session structure can be deleted. In one illustrative, nonlimiting embodiment, this operation may perform the following checks: check whether the session is an owner session and the corresponding DHT entry has aged out or not. If not, the operation may return a failure to the "session free" function. If the session is not an owner session, the corresponding DHT entry can be deleted automatically, and the operation may return a success to the "session free" function. If all cached sessions are deleted or freed, the corresponding owner session may not receive any heart beat signals, and the owner session may be deleted, for example, in a next function call to "session free". An owner session may be deleted after all the cached sessions are deleted.

In some cases (e.g., in some front-end cases), the cluster system may determine that a session is not resumable. For example, if any fatal alert is sent or received in connection with a SSL session, the session may be marked (e.g., by the owner core or the cluster system, in the DHT) as not resumable. All further SSL session resume requests corresponding to that session may be discarded or rejected. It may be helpful to recognize that in a single core system, there may be one copy of a session's session entry. Thus, as soon as the session is marked not resumable, the information may be available for all subsequent session resume requests, e.g., session->not_resumable=1. In a cluster system, on the other hand, a session entry may be owned by one core (owner core). Other (node, core)'s may have copies or access to the entry, e.g., depending on which core received the session resume request. If the session is to be marked as not-resumable in a core (owner or non-owner), the information may be updated such that it is accessible to each core having a reference (e.g., copy) to the session. In some embodiments, the cluster system uses a DHT API to perform the update.

The cluster system may include a DHT API or operation, sometimes referred to as dht_update. When a session has a status change (e.g., is marked not resumable on a core), the core can send an dht_update(key, oldvalue, newvalue) operation to the owner (node, core). The owner (node, core) can send a broadcast message to nodes and/or cores (e.g., to all cores, or to cores having a reference or cached session)

to update the oldvalue (e.g., valid or resumable) to newvalue (e.g., not resumable, expired, or invalid). If, for any reason, the dht_update operation's message cannot be conveyed across, the cluster system can queue the corresponding session in a list, and may retry or re-invoke the same operation until the operation succeeds.

In some embodiments, and in the case of backend SSL sessions for example, each core may open a SSL session to the backend server. Since sessions may not be shared between the cores, each core can maintain its session status (e.g., not-resumable) for incoming requests. For example, each core can mark its own local session as not-resumable. Because the sessions are not shared across cores, each core can maintain its own count of a maximum reuse limit of the session.

The cluster system may support re-handshake operations. In some embodiments, and in the front-end for example, a re-handshake (e.g., a SSL Re-handshake) may operate similarly on a core that owns a session as on a core having a reference copy. During re-handshake, a new session may be created on the core on which re-handshake is taking place. The old session can still exists as the old session is not marked not-resumable (or invalid or expired).

The cluster system may support SSL data insertion. SSL data insertion involving client certificates may require a client certificate to be copied, e.g., from the DHT or from the owner core, to a core which has reference copy of the session. When session cloning is complete, a client's certificate may be copied in addition to session data structure contents. Other pointers holding the Intermediate-CA certificate chain sent by the client may not be copied in some embodiments. In some cases, such pointers may not be valid on the core which does not own the session.

Figure 9B:
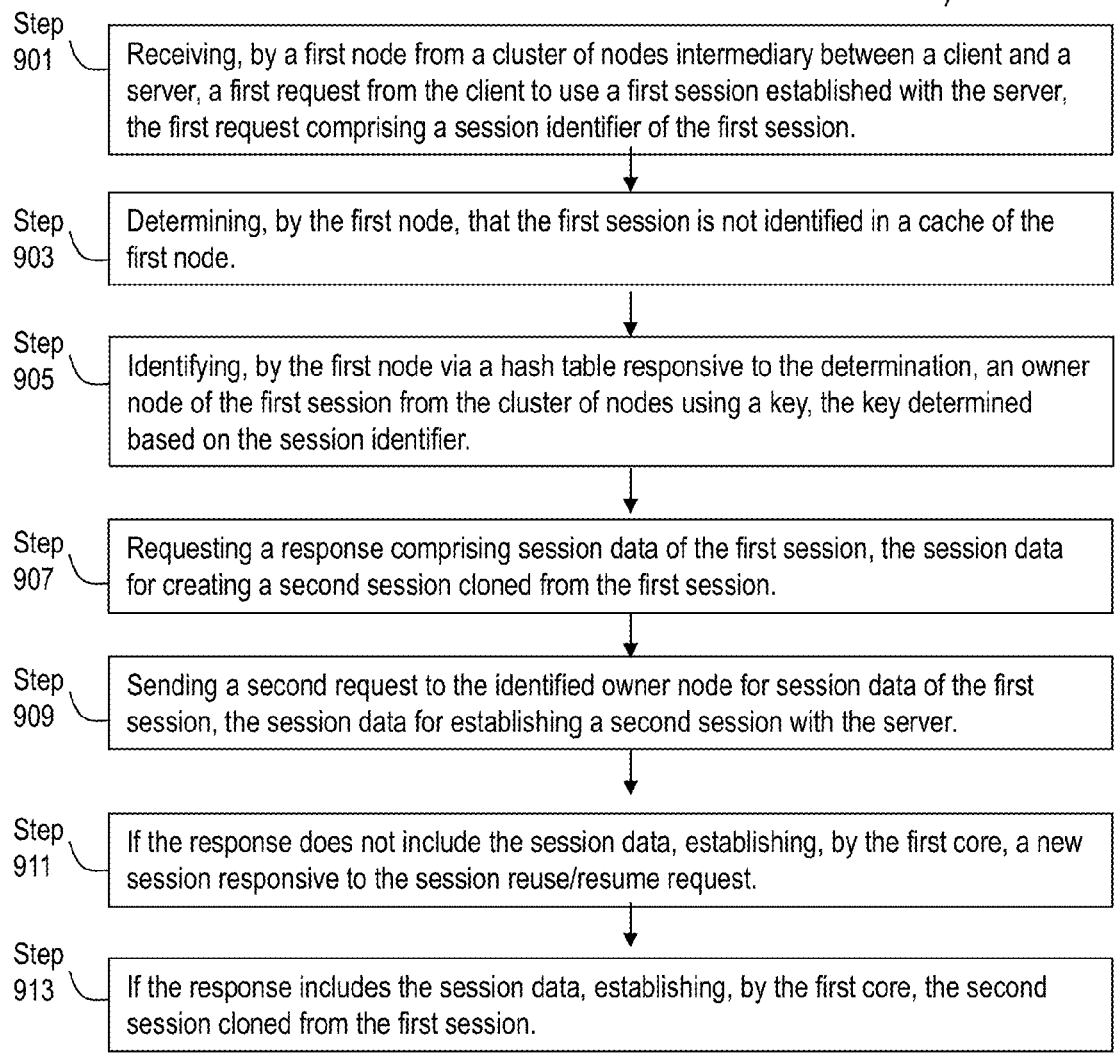
FIG. 9B is a flow diagram of an embodiment of steps of a method managing one or more SSL sessions.

Referring now to FIG. 9B, one embodiment of a method for managing one or more SSL sessions in a cluster system is depicted. The method may include receiving, by a first node from a cluster of nodes intermediary between a client and a server, a first request from the client to use a first session established with the server (901). The first request may include a session identifier of the first session. The first node may determine that the first session is not identified in a cache of the first node (903). The first node may identify, via a hash table responsive to the determination, an owner node of the first session from the cluster of nodes using a key (905). The key may be determined based on the session identifier. The first node may send a second request to the identified owner node for session data of the first session (907). The session data may be for establishing a second session with the server. If the response does not include the session data, the first core may establish a new session responsive to the session reuse request (909). If the response includes the session data, the first core may establish the second session cloned from the first session (911).

Referring to (901) and in further details, a first node (e.g., a receiving node) from a cluster of nodes intermediary between a client and a server may receive a first request from the client to use a first session established with the server. The cluster may be intermediary between at least client and at least one server. In some embodiments, a distributor module or mechanism of the intermediary may direct the request to the first node. The first/receiving node may receive a request to reuse, resume, clone, access or otherwise use a session previously established with the server. The receiving node may receive a request to use or access a SSL session, for example, between the client and the cluster, which may be referred to as a front-end side session. The receiving node may receive a request to use or access a SSL session between the cluster and the server, which may be referred to as a back-end side session. The receiving node may receive a request to use or access a SSL session between the client and the server. A core of the first node may be identified by the first node to receive a session reuse/resume/clone request.

The client may have, or may not have knowledge about the requested session. The session may be active or inactive, valid or invalid, expired and/or unexpired, reusable or non-reusable, and/or resumable or non-resumable. The session may have been transferred from one node or core to another node or core, or is in the process of being transferred. The client may be trying to access or resume a previous session (e.g., the requested session) with the server. The client may generate and send the request identifying the first session. The first request may include a session identifier of the first session. The session identifier may be used to identify the requested session. The first request may include a connection identifier, and/or any other identifier associated with the first session, for example, an identifier of an application executing on the client, an identification of a user, an identifier of URL of a resource of the server, an IP address and/or port number of the client and/or server. The session identifier may comprise an identifier generated from any of these information, and may be assigned to the first session, the user, the client, the application, the resource and/or the server.

The receiving node may intercept or receive the request from the client. If the request does not include a session identifier, the receiving node may create or assign a new session identifier. The receiving node may, for example, establish a session local to the corresponding receiving core's cache, responsive to the request and/or session identifier. In some embodiments, the client generates and/or sends the request as part of a handshaking process for reusing, resuming, cloning or otherwise establishing a SSL session with the cluster and/or server. The first or receiving node may receive the request from the client as part of a handshaking process, e.g., a SSL handshaking process. The first or receiving node may receive the request for establishing a SSL session with the cluster and/or server. For example, the first node may receive a client-hello message that includes a session identifier for the requested session. The receiving node, e.g., a first (node, core) of the cluster system may receive the request, e.g., as discussed above in connection with FIG. 9A. The receiving node may receive the request comprising one or more packets. The request may be sent, directed or assigned to the receiving core by the cluster, another node of the cluster system, or a flow distributor mechanism or feature associated with the cluster system (e.g., RSS and/or DFD).

Referring to (903) and in further details, the first node may determine whether the first session is identified or referenced in a cache of the first node. The first node may determine whether the first session is identified or referenced in a cache of a core of the first node. For example, the first node may check a cache of some or all cores of the first node. The first node may determine whether a session description, data structure, configuration, log file and/or status of the first session is stored in the cache or other location. For example, a receiving core may search a log file of the first node for any match or reference to the session identifier. The receiving or first node may determine that the (e.g., first) session is not identified in a cache of the receiving node. The receiving node may determine if the session is identified in a local cache of a corresponding receiving core. The receiving core may determine that the first session is not identified in the cache based on the session identifier of the first session. The receiving core may determine this based on a search or match against data maintained in the cache, for example.

The receiving core may determine if any sessions (e.g., sessions that may be active, established, inactive, resumable, etc.) are associated with the receiving core or its cache. The receiving node may determine if any sessions are owned by a core of the receiving node. The receiving node may compare or match the session identifier with those of sessions associated with the receiving node or its cache(s). The receiving node may determine that the session is not identified in cache(s) of the node's core(s), based on an absence of any sessions associated with the receiving node or the cache(s). The receiving node may determine that the session is not identified in cache(s) of the node's core(s), based on a comparison of the session identifier with those of sessions associated with the receiving node or the cache(s).

The receiving/first node may determine that the first node is not the owner node of the first session, e.g., responsive to the determination or comparison. The receiving/first node ma determine that the first node is not the owner node of the first session, based on the session identifier. The receiving/first node ma determine that the first node is not the owner node of the first session, based on an absence of any session maintained, established and/or referenced in the first node's cache(s). The receiving/first node ma determine that the first node is not the owner node of the first session, based on information maintained in a hash table, for example a DHT as described above in connection with FIG. 9A In some cases, the receiving node may determine that the session is identified in a cache of the receiving core. The receiving node may determine that it is the owner node of the requested session. The receiving node may proceed to reuse or resume the session, e.g., if the session is valid, reusable, resumable and/or unexpired. If the session is invalid, not reusable, not resumable or expired, a receiving core of the receiving node may re-establish the session, e.g., based on session data recovered from or stored for the session. If the session is invalid, not reusable, not resumable or expired, the receiving core may establish a session (e.g., a new session) responsive to the request.

Referring to (905) and in further details, the first node may identify, via a hash table responsive to the determination, an owner node of the first session from the cluster of nodes using a key. For example, a core of the first node may generate the key based on at least one of the session identifier or a unique identifier of an entity (e.g., the client or an application) from which the first request is received. The key may be determined based on the session identifier. The key may be determined based on the unique identifier, which may comprise an IP address, a virtual IP address, a network identifier and/or a port number. The key may comprise a hash table key of a distributed or shared hash table. The receiving or first node may identify an owner node of the first session using the key. If the receiving node determines that the session is not identified in a cache of the receiving node, the receiving node may access a hash table, for example a DHT as described above in connection with FIG. 9A.

The receiving node may receive and/or store a copy of the hash table. The receiving node may receive and/or store a portion of the hash table. The receiving node may send a query to the hash table, e.g., using the key. The receiving node or core may access a hash table via an API, which may include or support one or more functions or operations (e.g., dht_get, as discussed above in connection with FIG. 9A). A receiving core of the receiving node may compute, calculate, determine, form or otherwise generate a key based on data comprising at least one or both of the session identifier and a unique identifier of an entity from/at which the request is received (e.g., a VIP, PE, node). The receiving core may form the key by applying a predefined function or transformation on the data.

The receiving node may use the key to index into the hash table, which may be a copy or a portion (e.g., a local copy) of a distributed or shared hash table of the cluster system. For example, the receiving core may use the API to invoke an operation (e.g., dht_get operation), to access the hash table. The hash table may output, return or provide an identification of the owner core based on the key. The receiving core may use the key to index into or otherwise access the hash table to determine if the session is valid, resumable and/or available at the owner core.

Referring to (907) and in further details, the receiving/first core may send a second request to the identified owner node for session data of the first session. The receiving/first core may send the second request responsive to identification of the owner core. The receiving/first core or the cluster system may request a response (e.g., from the owner core or from the hash table) for session data of the (e.g., first) session. In some embodiments, the receiving/first core may access the hash table for at least a portion of the session data, e.g., using the key.

The receiving/first core may send a second request to initiate, clone or otherwise establish a second session. For example, the receiving/first core may send a second request to initiate a handshake for establishing the second session. The session data may be for establishing a second session with the server. The session data may be for creating a second session cloned from the first session. In some embodiments, the receiving core may request the response via the API, e.g., as part of the dht_get operation or step. Responsive to the operation (e.g., using the key to index into or otherwise access the hash table), the hash table or the owner core may return or provide a set of data. The set of data may include session data or data associated with the requested session. The session data may be used by the receiving core to establish a second session, e.g., by cloning or making a copy of the requested session.

The session data may be for creating a second session with certain aspects (e.g., data structure, settings, policies, configuration, communication protocol) similar to or the same as the first session. For example, the session data may include SSL configuration and/or other information, such as authentication settings for the second session. In some embodiments, the first node may request for session data including a status of the first sessions, e.g., whether the first session can be reused, resumed and/or cloned. For example, the first node may request for session data including a reuse or resume limit for the first session. The first node may receive a response to the second request, the response indicating that the requested first session is invalid, expired and/or not resumable. The first node may receive a response to the second request, the response indicating that the requested first session is valid, unexpired and/or resumable.

Referring to (909) and in further details, if the response does not include the session data, the receiving/first core may establish a new session responsive to the session reuse/resume request. The first node may establish a new session if there is no response to the second request, or if a response to the second request does not include the requested session data. The owner core may not respond to the second request, or may respond to the second request without the session data (or with incomplete session data).

In some cases, the hash table may include a status of the requested session, or information indicating that the session is invalid, expired or not resumable. In such a situation, the hash table may not respond, or may not respond with the session data. The hash table and/or the owner node may provide a response indicating that the requested session is invalid, expired or not resumable.

If the requested session is expired or no longer active, the receiving core may attempt to establish (or resume) the session responsive to the session resume/reuse request. The receiving core may create or assign a new session identifier, and may establish or resume the session corresponding to the new session identifier, responsive to the session resume/reuse request. The receiving core may update the hash table with the new session identifier. In certain embodiments, the receiving core may install or initiate installation of the session at the owner core (e.g., as determined via the hash table). The receiving core may update the hash table via the hash table API, e.g., using a dht_put operation discussed above in connection with FIG. 9B.

If the requested session is invalid or not resumable, the receiving core may establish a new session responsive to the session reuse/resume request. The receiving core may create or assign a new session identifier, and may establish a new session corresponding to the new session identifier, responsive to the session reuse/resume request. The receiving core may add the new session to the receiving core's cache. In one embodiment, the receiving core may establish itself as an owner core of the established session, e.g., by updating the hash table. The receiving core may update the hash table with the new session. The receiving core may install the new session and/or update the hash table via the hash table API, e.g., using the dht_put operation.

Referring to (911) and in further details, if the response includes the session data, the receiving/first core may establish a (e.g., second) session cloned from the first session. The first node may establish the second session if a response to the second request includes the requested session data. The second session may comprise a session cloned from the first session. In some embodiments, the distributed or shared hash table may provide a response or data comprising the session data, responsive to indexing using the key. The hash table may provide data comprising the session data, responsive to a determination that the requested session is valid, unexpired, reusable, resumable and/or available at the owner core. In some embodiments, the owner core may provide or send at least a portion of the session data, e.g., responsive to the second request. The hash table and/or owner core may provide a minimal set of data for cloning the session at the receiving core.

The receiving core of the receiving node may clone or make a copy of the requested session based on the session data. The receiving core may establish a session data structure consistent with the requested session, using the session data. The receiving core may establish the cloned session in or from a local cache of the receiving core. For example, the receiving core may establish, maintain and/or store a data structure and/or settings of the second session in the local cache. The cache may comprise memory of the receiving core. The receiving core may establish a protocol stack of the second session in the cache. The established second session may be referred to as a cached session. The locale cache may not be accessible by another core and/or node. The receiving core or cached session may provide regular or heart beat signals to the owner core or owner session, to indicate that the cached session has not aged-out, expired, or been deleted.

In some embodiments, responsive to establishment of the second session, the first node may store information about the second session in at least one of the hash table (e.g., a local copy of the hash table) and/or the cache of the first node. In some embodiments, responsive to completion of session cloning, a client's certificate may be copied (e.g., to the second session and/or to the cache of the receiving core). The client's certificate may be copied in addition to session data structure contents from the first session. In certain embodiments, some pointers holding an intermediate-CA certificate chain sent by the client may not be copied. In some cases, such pointers may not be valid on a core which does not own the session.

It should be noted that certain passages of this disclosure may reference terms such as "first" and "second" in connection with nodes, requests, etc., for purposes of identifying or differentiating one from another or from others. These terms are not intended to merely relate entities (e.g., a first request and a second request) temporally or according to a sequence, although in some cases, these entities may include such a relationship. Nor do these terms limit the number of possible entities (e.g., nodes) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as disclosed herein.

We claim:

1. A method for managing one or more secure socket layer (SSL) sessions, the method comprising:
    (a) receiving, by a first core of a first node from a cluster of nodes interconnected by a communication back plane and intermediary between a client and a server, a first request from the client to use a first session established with the server, the first request comprising a session identifier of the first session;
    (b) determining, by the first core of the first node, that the first session is not identified in a cache of the first node;
    (c) identifying, by the first node via a hash table responsive to the determination, an owner node and owner core of the first session from the cluster of nodes using a key, the key determined based on the session identifier, wherein the owner node comprises a second node of the plurality of nodes and the owner core comprises a second core on the second node;
    (d) sending via the communication back plane a second request to the identified owner node and owner core for session data of the first session, the session data for establishing a second session with the server; and (e) establishing, by the first core of the first node responsive to the first request, a new session if a response to the second request does not include the requested session data of the first session, or;

(f) establishing, by the first core of the first node responsive to the first request, the second session as a copy of the first session if a response to the second request includes the requested session data of the first session.

2. The method of claim 1, wherein (a) comprises receiving the first request to reuse, resume or clone the first session.

3. The method of claim 1, wherein (a) comprises receiving the first request from the client as part of a handshaking process for establishing a SSL session with the server.

4. The method of claim 1, wherein (b) comprises determining that the first session is not identified in the cache based on the session identifier of the first session.

5. The method of claim 1, wherein (b) comprises determining that the first node is not the owner node of the first session.

6. The method of claim 1, wherein (c) comprises generating the key based on at least one of the session identifier or a unique identifier of an entity from which the first request is received.

7. The method of claim 1, further comprising receiving a response to the second request, the response indicating that the requested first session is invalid, expired or not resumable.

8. The method of claim 1, further comprising establishing, by the first node, the new session if there is no response to the second request.

9. The method of claim 1, further comprising establishing, by the first node, the second session comprising a session cloned from the first session using the requested session data.

10. The method of claim 1, further comprising storing information about the second session in at least one of the hash table or the cache of the first node.

11. A system for managing one or more secure socket layer (SSL) sessions, the system comprising:
   a cluster of nodes interconnected by a communication back plane and intermediary between a client and a server; and
   a first core of a first node from the cluster of nodes, the first core of the first node configured to:
      receive a first request from the client to use a first session established with the server, the first request comprising a session identifier of the first session;
      determine whether the first session is identified in a cache of the first node;
      identify, via a hash table responsive to the determination, an owner node and owner core of the first session using a key, the key determined based on the session identifier;
      send a second request via the communication back plane to the identified owner node and owner core for session data of the first session, the session data for establishing a second session with the server, wherein the owner node comprises a second node of the plurality of nodes and the owner core comprises a second core on the second node; and
      wherein the first node is configured to establish a new session responsive to the first request if the response to the second request does not include the requested session data of the first session or
      establish the second session, responsive to the first request, as a copy of the first session if a response to the second request includes the requested session data of the first session.

12. The system of claim 11, wherein the first node is configured to receive the first request, the first request to reuse, resume or clone the first session.

13. The system of claim 11, wherein the first node is configured to receive the first request from the client as part of a handshaking process for establishing a SSL session with the server.

14. The system of claim 11, wherein the first node is configured to determine whether the first session is identified in the cache based on the session identifier of the first session.

15. The system of claim 11, wherein the first node is configured to determine whether the first node is the owner node of the first session.

16. The system of claim 11, wherein the first node is configured to generate the key based on at least one of the session identifier or a unique identifier of an entity from which the first request is received.

17. The system of claim 11, wherein the first node is configured to receive a response to the second request, the response indicating that the requested first session is invalid, expired or not resumable.

18. The system of claim 11, wherein the first node is configured to establish a new session if there is no response to the second request.

19. The system of claim 11, wherein the first node is configured to establish the second session comprising a session cloned from the first session using the requested session data.

20. The system of claim 11, wherein the first node is configured to store information about the second session in at least one of the hash table or the cache of the first node.

* * * * *